(12) United States Patent
Huo et al.

(10) Patent No.: US 12,118,380 B2
(45) Date of Patent: Oct. 15, 2024

(54) CONTAINER STORAGE SYSTEM IN REMOTE PODS IN KUBERNETES

(71) Applicant: International Business Machines Corporation, Armonk, NY (US)

(72) Inventors: Qi Feng Huo, Beijing (CN); Da Li Liu, Beijing (CN); Yuan Yuan Wang, Beijing (CN); Lei Li, Beijing (CN); Yan Song Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 17/467,523

(22) Filed: Sep. 7, 2021

(65) Prior Publication Data
US 2023/0071714 A1    Mar. 9, 2023

(51) Int. Cl.
G06F 9/455    (2018.01)
G06F 9/445    (2018.01)
H04L 67/1097    (2022.01)
H04L 67/561    (2022.01)

(52) U.S. Cl.
CPC ...... *G06F 9/45558* (2013.01); *G06F 9/44505* (2013.01); *H04L 67/1097* (2013.01); *H04L 67/561* (2022.05); *G06F 2009/45583* (2013.01); *G06F 2009/45595* (2013.01)

(58) Field of Classification Search
None
See application file for complete search history.

(56) References Cited

U.S. PATENT DOCUMENTS

| 11,481,243 B1 | 10/2022 | Wang et al. |
| 2020/0073692 A1 | 3/2020 | Rao et al. |
| 2020/0356397 A1 | 11/2020 | Kumatagi et al. |

(Continued)

FOREIGN PATENT DOCUMENTS

| CN | 110569111 A | 12/2019 |
| CN | 112000421 A | 11/2020 |

(Continued)

OTHER PUBLICATIONS

Viktorsson, William, Cristian Klein, and Johan Tordsson. "Security-performance trade-offs of kubernetes container runtimes." In 2020 28th International Symposium on Modeling, Analysis, and Simulation of Computer and Telecommunication Systems (MASCOTS), pp. 1-4. IEEE, 2020. (Year: 2020).*

(Continued)

*Primary Examiner* — Frank D Mills
(74) *Attorney, Agent, or Firm* — Cantor Colburn LLP; Teddi Maranzano

(57) ABSTRACT

Embodiments are directed to a container storage system in remote pods. A worker node virtual machine determines that a volume is available for attachment to the worker node virtual machine. An intermediary software of the worker node virtual machine causes a pod container storage interface to attach the volume to a pod virtual machine. in response to attaching the volume to the pod virtual machine, the intermediary software of the worker node virtual machine causes the pod container storage interface to mount the volume to the pod virtual machine such that the volume is available for use by the pod virtual machine.

20 Claims, 15 Drawing Sheets

(56) References Cited

U.S. PATENT DOCUMENTS

| | | | |
|---|---|---|---|
| 2021/0141655 A1 | 5/2021 | Gamage et al. | |
| 2021/0211408 A1* | 7/2021 | Porras | G06F 11/3409 |
| 2021/0311764 A1* | 10/2021 | Rosoff | G06F 9/54 |
| 2022/0197567 A1* | 6/2022 | Litke | G06F 3/067 |
| 2022/0198054 A1* | 6/2022 | Picos | G06F 21/6245 |
| 2022/0206834 A1* | 6/2022 | Shah | G06F 3/067 |
| 2022/0229605 A1* | 7/2022 | Degwekar | G06F 3/0604 |
| 2023/0068221 A1* | 3/2023 | Magowan | G06F 8/60 |
| 2023/0222006 A1 | 7/2023 | Zhu | |

FOREIGN PATENT DOCUMENTS

| | | |
|---|---|---|
| CN | 112764766 A | 5/2021 |
| WO | 2023035830 A1 | 3/2023 |

OTHER PUBLICATIONS

Qin, Shijun, Heng Wu, Yuewen Wu, Bowen Yan, Yuanjia Xu, and Wenbo Zhang. "Nuka: A generic engine with millisecond initialization for serverless computing." In 2020 IEEE International Conference on Joint Cloud Computing, pp. 78-85. IEEE, 2020. (Year: 2020).*
"Use the Azure disk Container Storage Interface (CSI) drivers in Azure Kubernetes Service (AKS) (preview)"; Microsoft; Aug. 27, 2020;13p.
Ali, "Container Storage Interface (CSI) for Kubernetes GA"; Kebernetes Blog; Jan. 15, 2019; 6p.
Anonymous, "Enabling ActiveDR for ESXi Storage" ; Purestorage; Jun. 21, 2020; 18p.
Anonymous, "Kubernetes CSI"; NexentaEdge; retrieved Jun. 24, 2021; 5p.
Anonymous; "Kubernetes vSphere CSI Driver"; Github; retrieved Jul. 20, 2021; 3p.
Anonymously. "Compatibility Virtual Layer for Legacy Software to Mimic VM Guest for Containers"; ip.com IPCOM000264741D; Jan. 22, 2021; 4 pages.
Huo, "Using a Remote Pod in Kubernetes", U.S. Appl. No. 17/467,518, filed Sep. 7, 2021.
List of IBM Patents or Patent Applications Treated as Related; Date Filed: Sep. 7, 2021. 2 pages.
Nils, "Key Vault CSI Driver Integrated with AAD-Managed Pod Identities"; blog.nillsf.com retreived on Jun. 24, 2021; 12p.
Yao, "QAT enabling in Virtlet"; Akraino Confluence; Apr. 28, 2020; 5p.
International Search Report; International Application No. PCT/CN2022/110518; International Filing Date: Aug. 5, 2022; Date of mailing: Oct. 26, 2022; 8 pages.
UK Examination Report; Dated: Apr. 2, 2024; Application No. GB2403192.4; Filed: Aug. 5, 2022; 4 pages.
Reply to UK Examination Report; Dated: May 1, 2024; Application No. GB2403192.4; Filed: Aug. 5, 2022; 3 pages.

* cited by examiner

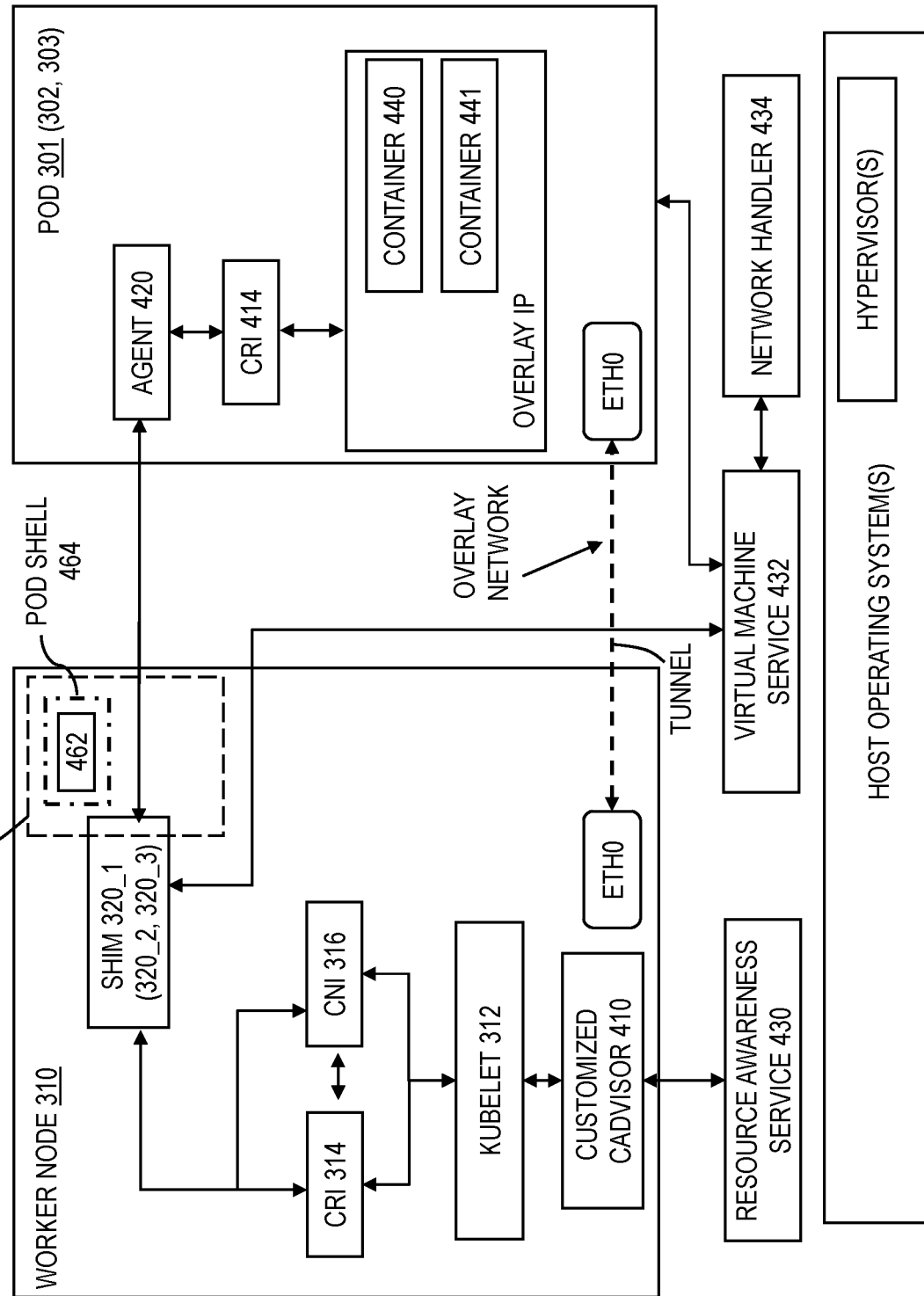

RECEIVE THE POD DESCRIPTION OR POD DESCRIPTOR FOR CREATING A NEW POD IN THE CLUSTER ON A HOST MACHINE  502

USE KUBELET TO MONITOR THE POD AND CALL A SANDBOX FUNCTION (AS AN ENVIRONMENT) IN RUNTIME SOFTWARE (HAVING COMPUTER-EXECUTABLE INSTRUCTIONS)  504

START/CREATE A NEW SHIM FOR PREPARATION OF THE NEW POD  506

USE SHIM TO CALL A (POD) VIRTUAL MACHINE SERVICE AND CAUSE VIRTUAL MACHINE SERVICE TO CREATE/INSTANTIATE POD VIRTUAL MACHINE  508

USE SHIM TO PERFORM POD VIRTUAL MACHINE INITIALIZATION, TO CREATE/CALL/SET UP AN AGENT, TO CREATE/CALL/SET UP AN INNER CRI (E.G., INNER CONTAINER CRI) IN POD VIRTUAL MACHINE, TO SET UP NETWORK AND TUNNEL BETWEEN WORKER NODE VIRTUAL MACHINE AND POD VIRTUAL MACHINE  510

CALL/CAUSE INNER CRI TO CREATE EXAMPLE CONTAINERS  512

CUSTOMIZED CADVISOR AND/OR KUBELET ARE CONFIGURED TO CALL A RESOURCE AWARENESS SERVICE IN ORDER TO REPORT POD VIRTUAL MACHINE FOR RESOURCE MONITORING  514

CONTAINER STORAGE SYSTEM IN REMOTE PODS IN KUBERNETES

BACKGROUND

The present invention generally relates to computer systems, and more specifically, to computer-implemented methods, computer systems, and computer program products configured and arranged for a new container storage system in remote pods in Kubernetes.

Kubernetes, commonly referred to as K8s, is an open-source container-orchestration system for automating computer application deployment, scaling, and management. Particularly, it aims to provide a platform for automating deployment, scaling, and operations of application containers across clusters of hosts. Kubernetes works with a range of container tools and runs containers in a cluster, often with images built using Docker. Docker is a set of platform as a service (PaaS) products that use operating service (OS) level virtualization to deliver software in packages called containers. Containers are isolated from one another and bundle their own software, libraries, and configuration files; containers can communicate with each other through well-defined channels. All of the containers can share the services of a single operating system kernel. The basic scheduling unit in Kubernetes is a pod. A pod is a grouping of containerized components. A pod includes one or more containers that are guaranteed to be co-located on the same node. Many cloud services offer a Kubernetes-based platform or infrastructure as a service on which Kubernetes can be deployed as a platform-providing service. A scheduler is the pluggable component that selects which node an unscheduled pod (i.e., the basic entity managed by the scheduler) runs on, based on resource availability. The scheduler tracks resource use on each node to ensure that workload is not scheduled in excess of available resources. Although existing techniques for pods having containers that are configured to start and run a software application on a node in the cloud are suitable for their intended purposes, what is needed is a system having certain features of embodiments of the present invention.

SUMMARY

Embodiments of the present invention are directed to computer-implemented methods for a new container storage system in remote pods in Kubernetes. A non-limiting example computer-implemented method includes determining, by a worker node virtual machine, that a volume is available for attachment to the worker node virtual machine. The computer-implemented method includes using an intermediary software of the worker node virtual machine to cause a pod container storage interface to attach the volume to a pod virtual machine. Also, the computer-implemented method includes, in response to attaching the volume to the pod virtual machine, using the intermediary software of the worker node virtual machine to cause the pod container storage interface to mount the volume to the pod virtual machine such that the volume is available for use by the pod virtual machine.

This can provide an improvement over known methods by attaching and mounting a volume to a remote pod running in separate virtual machine from the worker node, thereby overcoming the issue of when a remote pod runs in a separate virtual machine from the worker node, the volume attached to the worker node cannot be mounted to the remote pod.

In addition to one or more of the features described above or below, or as an alternative, in further embodiments of the invention the volume is a persistent volume. Thus, this advantageously provides a technique to mount a persistent volume to the remote pod running in a separate virtual machine from the worker node.

In addition to one or more of the features described above or below, or as an alternative, in further embodiments of the invention the worker node virtual machine is configured to receive a request to attach the volume, and instead of attaching the volume to the worker node virtual machine, the request triggers the intermediary software to cause the volume to be attached to the pod virtual machine. Thus, this advantageously provides a technique to attach the volume to the remote pod running in a separate virtual machine from the worker node.

In addition to one or more of the features described above or below, or as an alternative, in further embodiments of the invention the worker node virtual machine is configured to receive a request to mount the volume, and instead of mounting the volume to the worker node virtual machine, the request triggers the intermediary software to cause the volume to be mounted to the pod virtual machine. Thus, this advantageously provides a technique to mount the volume to the remote pod running in a separate virtual machine from the worker node.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a block diagram of an example architecture in the system for providing and using remote pods as virtual machines in Kubernetes in accordance with one or more embodiments of the present invention;

FIG. 5 depicts a flowchart of a computer-implemented process for providing and using remote pods as virtual machines for Kubernetes in accordance with one or more embodiments;

DETAILED DESCRIPTION

Figure 1:
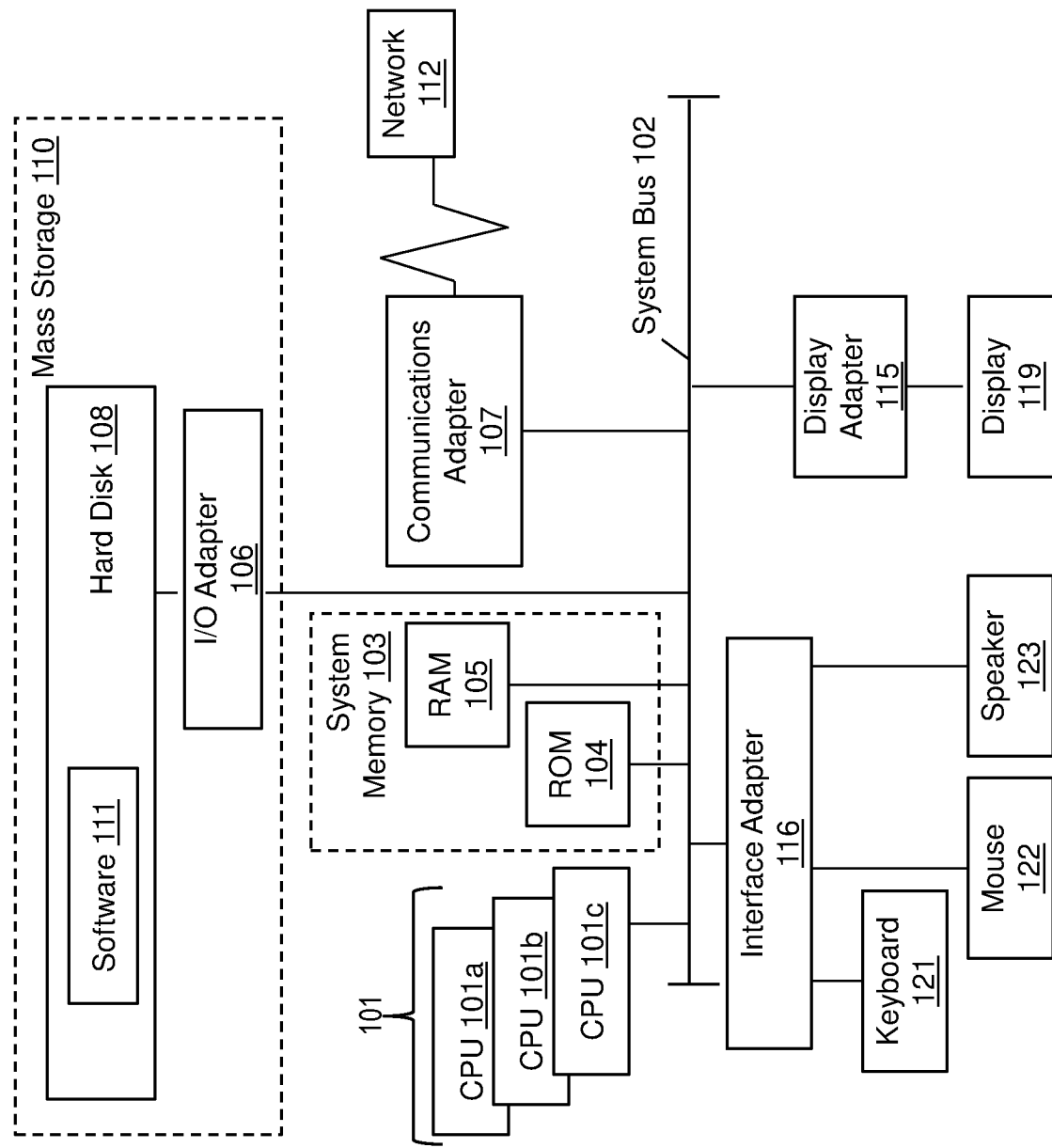
FIG. 1 depicts a block diagram of an example computer system for use in conjunction with one or more embodiments of the present invention.

One or more embodiments of the present invention provide computer-implemented methods, computer systems, and computer program products arranged and configured for providing a new container storage system in remote pods in Kubernetes. One or more embodiments of the invention introduce a new worker and pod hierarchy in which a pod virtual machine logically belongs to a worker node virtual machine, but the pod virtual machine is physically run in a virtual machine remote from the worker virtual machine. Therefore, the pod virtual machine has both better isolation and better performance by being in its own virtual machine. Further, one or more embodiments provide a new container storage system by adding a container storage interface (CSI) pod plugin which can be utilized with a CSI controller plugin and CSI node plugin. According to one or more embodiments, persistent volume, for example, such as a file storage and/or a block storage, can be attached to the remote pod virtual machine and mounted to containers in the remote pod using the new CSI pod plugin.

In a typical Kubernetes cluster, the workload (e.g., software application) is running within a pod as containers which are processes of a worker node. Kata Containers, which is open source and is open container initiative (OCI) compliant, introduced a virtual machine as a pod, so that workloads are running within a guest virtual machine in/on a worker node for cloud native application. However, the Kata pod running as a guest virtual machine on the worker node virtual machines creates performance problems. In particular, a second level virtual machine or nested virtual machine usually has a 5-10% loss for central processing units (CPU) and memory usage/efficiency, and an even worse loss for input/output (I/O) such as input/output operations per second (IOPS). As a worst case scenario, the downgrade for I/O is about 30%.

One or more embodiments provide a new system that can make the pod virtual machine run (physically) as a peer virtual machine, while still logically belonging to the worker node virtual machine. In this way, the system is consistent with the Kubernetes functionality and avoids the performance loss/issues of a nested virtual machine in Kata. Technical benefits and advantages provide better isolation between a worker node virtual machine and a remote pod virtual machine because the worker node cannot directly access the managed remote pod virtual machines, according to one or more embodiments. Technical benefits and advantages include better performance of the remote pod virtual machines in terms of CPU, memory, and disk usage/performance. Additionally, one or more embodiments prover better extensibility because the remote pod virtual machines are not limited by the resources of the worker node virtual machine and can deployed on any host machine.

Further, typically a CSI driver does not work in the remote pod system because the CSI will attach a persistent volume to the worker node first, then mount the volume to pod contained within the worker node. However, the remote pod virtual machine is running in a separate virtual machine from the worker node virtual machine in accordance with one or more embodiments, thereby not being contained within the worker node virtual machine. Accordingly, a new container storage system is provided that uses the new CSI pod plugin component in the remote pod virtual machine to attach and mount the persistent volume when the remote pod virtual machine is not contained in the worker node virtual machine. One or more embodiments disclose an extended VolumeAttachment Object to describe the volume attachment along with a technique to help attach the persistent volume to the remote pod virtual machine.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
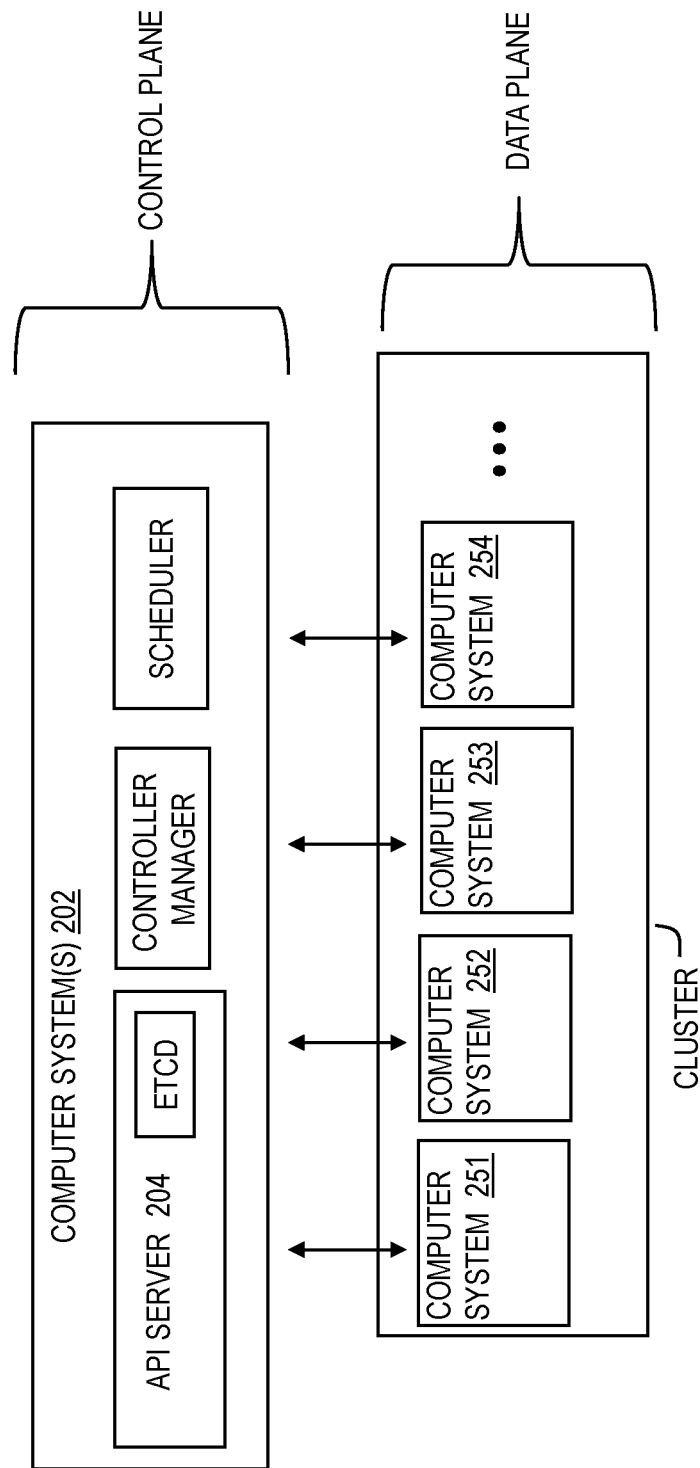
FIG. 2 depicts a block diagram of a system for providing and using remote pods in Kubernetes in accordance with one or more embodiments of the present invention.

FIG. 2 is a block diagram of a system 200 for providing and using remote pods in Kubernetes in accordance with one or more embodiments of the present invention. System 200 includes computer system 202 coupled to computer systems 251, 252, 253, 254. Computer system 202 may be referred to as the control node, master node, Kubernetes deployment controller, etc. Computer system 202 may be part of the control plane. Computer systems 251, 252, 253, 254 can each be a server in a cluster. For illustration purposes, computer systems 251, 252, 253, 254 can each host one or more worker nodes in the cluster and can generally be referred to as computer systems 251-254. Computer systems 251-254 can be hosts or host machines for nodes and for running virtual machines as discussed further herein. Computer system 202 and computer systems 251-254 can include any elements and functions of computer system 100 discussed in FIG. 1, in order to perform according to one or more embodiments.

Kubernetes has a control plane/panel at the top, which is also called the master node. After the control plane (e.g., computer system 202) receives a workload, which is the application, API server 204 saves the application to "etcd" as an API object. In Kubernetes, the controller manager is responsible for orchestration through the control cycle. This control cycle is used to perform the orchestration, helping to create pods required by these applications. Once a pod appears, the scheduler watches the changes of the new pod. If the scheduler finds a new pod, it helps run the scheduling algorithms and write the running result, (e.g., the name of a node on the NodeName field of the pod object, which is the so-called binding operation). Then, the scheduler writes the binding result back to etcd, which is the working process of the scheduler. As a result, the pod is bound to a node, which is called scheduling. For example, the pod is bound to a worker node.

The kubelet (e.g., kubelet 312 in FIG. 3) watches/monitors the changes of all pod objects, and when it finds that a pod is bound to a node, the kubelet performs all the subsequent tasks. After the kubelet obtains this information, the kubelet calls the containerd process that runs on each machine and runs every container in this pod. At this time, containerd (e.g., CRI 314 in FIG. 3) can call other runtimes (e.g., runc, shim, etc.). Accordingly, runtimes can help set up these namespaces and cgroups, and help build a container required by an application.

Figure 3:
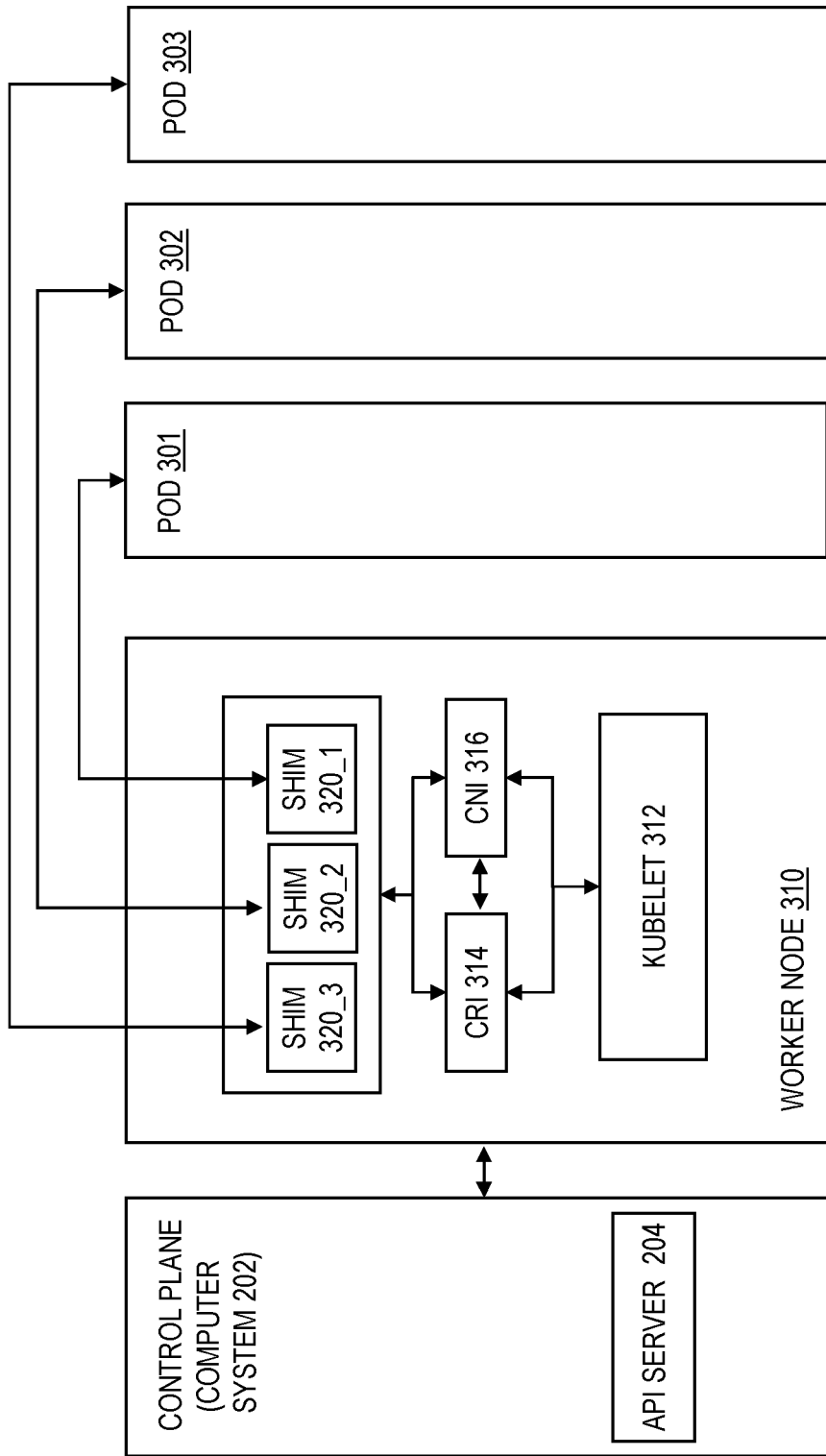
FIG. 3 depicts a block diagram of node and pod hierarchy in a system for providing and using remote pods as virtual machines in Kubernetes in accordance with one or more embodiments of the present invention.

FIG. 3 is a block diagram of a node and pod hierarchy in system 200 for providing and using remote pods in Kubernetes in accordance with one or more embodiments of the present invention. FIG. 3 depicts a worker node virtual machine 310, a pod virtual machine 301, a pod virtual machine 302, and a pod virtual machine 303. Worker node virtual machine 310 can be run on the same and/or different host machines as pod virtual machines 301, 302, 303 in any combination of options, where pod virtual machines 301, 302, 303 could be on the same and/or different host machines. For example, worker node virtual machine 310 and pod virtual machine 301 can be run on the same host machine, such as, for example, computer system 251. Also, worker node virtual machine 310 and pod virtual machine 301 can be run on two different host machines, such as, for example, computer systems 251 and 252 respectively. Likewise, worker node virtual machine 310 and pod virtual machine 302 can be run on the same host machine (e.g., both on computer system 251) and/or different host machines (e.g., one on computer system 251 and 253, respectively). Similarly, worker node virtual machine 310 and pod virtual machine 303 can be run on the same host machine (e.g., both on computer system 251) and/or different host machines (e.g., one on computer system 251 and 254, respectively). Even though each pod virtual machines 301, 302, 303 can be bound to worker node virtual machine 310, it should be appreciated that each of pod virtual machines 301, 302, 303 can be run on its own host machine, which could be different from the host machine running worker node virtual machine 310. Although three pods are discussed for explanation purposes, it should be appreciated that embodiments are not meant to be limited to three pods. Further, each host machine such as computer systems 251-254 has its own host operating system running its own hypervisor. When a pod virtual machine 301, 302, 303 is running on a different host machine and/or different computer system than worker node virtual machine 301, the hypervisor for each different host machine and/or computer system has to be in the same logical network.

Control plane has one or more application programming interface (API) servers 204 configured to communicate with a kubelet 312. API server 204 (also called api-server or apiserver) is a lightweight web application that allows Kubernetes to create and expose data APIs from data, without the need for custom development. The kubelet is the primary "node agent" that runs on each worker node. The kubelet can register the node with the apiserver using any one or more of the hostname, a flag to override the hostname, and/or specific logic for a cloud provider. The kubelet uses and works with a pod descriptor, such as PodSpec. A PodSpec is a YAML or JSON object that describes a pod. The Kubernetes resources are created in a declarative way, thus making use of, for example, YAML files. Kubernetes resources, such as pods, services, and deployments can be created by using the YAML files, as understood by one of ordinary skill in the art. The kubelet takes a set of PodSpecs that are provided through various mechanisms (primarily through the API server) and ensures that the containers described in those PodSpecs are running and healthy.

In FIG. 3, worker node virtual machine 310 has kubelet 312 configured to use container runtime interface (CRI) 314 to create one or more shims 320_1, 320_2, 320_3. Shims 320_1, 320_2, and 320_3 can generally be referred to as shims 320. Each shim 320_1, 320_2, 320_3 has a one-to-one relationship to its own pod virtual machine 301, 302, 303, respectively. Each individual shim 320_1, 320_2, 320_3 is configured to create its own pod virtual machine 301, 302, 303, respectively, such that pod virtual machines 301, 302, 303 are not nested in and/or guest virtual machines of worker node virtual machine 310. Container network interface (CNI) 316 is configured to make the IP network system in pod virtual machines 301, 302, 303 be managed by the IP network system in worker node virtual machine 310. CRI 314, CNI 316, and shims 320_1, 320_2, 320_3 are each pieces of software having computer-executable instructions which are executable on a processor such as processors 101.

CRI 314 is sometimes referred to as CRI containerd, containerd, containerd CRI, etc. CRI 314 is a high-level runtime and daemon that can be thought of as an API faceplate for other runtimes in the stack. While lower-level runtimes like runc handle the process of actually running a container, a higher-level runtime such as containerd handles container lifecycles, image management, and abstracting to a lower runtime. While lower-level runtimes provide mechanisms for building containers, containerd has mechanisms for building container platforms and has an API used by remote applications to provide monitoring and delegation. CRI includes APIs, specifications/requirements, and libraries for container runtimes to integrate with kubelet on a node. CNI 316 is a runtime and/or specification for managing network resources on a cluster. CNI consists of a specification and libraries for writing plugins to configure network interfaces in containers, along with a number of supported plugins. CNI concerns itself with network connectivity of containers and removing allocated resources when the container is deleted. Because of this focus, CNI has a wide range of support and the specification is simple to implement. When a Kubernetes component is unable to communicate with another component, a shim 320 is a piece of software configured to translate between the one component and the relevant Kubernetes interface. For example, shim 320 takes CRI commands and translates them into something agent 420 (depicted in FIG. 4) understands, and vice versa. Further, container runtime shim is a piece of software that resides in between a container manager (containerd, cri-o, podman) and a container runtime (runc, crun) solving the integration problem of these counterparts.

To provide further details, FIG. 4 is a block diagram of an example architecture in system 200 for providing and using remote pods as virtual machines in Kubernetes in accordance with one or more embodiments of the present invention. For conciseness, computer system 202 of the control plane is omitted in FIG. 4 but is understood to be present. FIG. 4 depicts an example using shim 320_1 in worker node virtual machine 310 to provide, create, and/or set up pod virtual machine 301 remote from worker node virtual machine 310. Pod virtual machine 301 could be hosted on a separate host machine remote from the host machine executing worker node virtual machine 310. Pod virtual machine 301 could be hosted on the same host machine as worker node virtual machine 310, while still being in a separate or remote virtual machine. Although examples may discuss using shim 320_1 in worker node virtual machine 310 to set up pod virtual machine 301, it should be appreciated that the description applies by analogy to shim 320_2 for setting up pod virtual machine 302 and shim 320_3 for setting up pod virtual machine 303.

FIG. 5 is a flowchart of a computer-implemented process 500 for providing and using remote pods as virtual machines for Kubernetes in accordance with one or more embodiments of the present invention. The computer-implemented process 500 in FIG. 5 can be implemented using system 200. Accordingly, the computer-implemented process 500 will now be described with reference to system 200.

At block 502, worker node virtual machine 310 is configured to receive the pod description or pod descriptor for creating a new pod in the cluster on a host machine. For example, kubelet 312 is configured to receive the pod description from computer system 202. The pod description can include pod specifications (e.g., PodSpecs) and be in YAML or JSON files. Each Kubernetes deployment uses a so called a pod template. This pod template provides a specification that determines what the pod should look like, what application runs inside of the pod's containers, and more, as understood by one of ordinary skill in the art. With the assistance of the scheduler, the controller manager of computer system 202 can reconcile or assign the pod to worker node virtual machine 310.

At block 504, worker node virtual machine 310 is configured to use kubelet 312 to monitor the pod and call a sandbox function (as an environment) in runtime software (having computer-executable instructions). In one or more embodiments, shim 320_1 can call the sandbox function as a computing environment, after the shim 320_1 has been started as discussed further below. The sandbox 460 or pod sandbox is an isolated computing environment on worker node virtual machine. For example, kubelet 312 is configured to call a sandbox function (e.g., run pod sandbox) in CRI 314 in order to start running the pod. A sandbox is a security mechanism for separating running programs, usually in an effort to mitigate system failures and/or software vulnerabilities from spreading. The sandbox is often used to execute programs or code without risking harm to the host machine or operating system. Kubelet 312 and/or CRI 314 can call CNI 316.

At block 506, worker node virtual machine 310 is configured to start/create a new shim 320_1 for preparation of the new pod if not already created above. For example, CRI 314 can call shim 320_1 for creation of the remote virtual machine for the new pod. Shim 320_1 is configured to create/start a shell pod 464 in the pod sandbox (environment), such that the shim 320_1 and/or the SHELL pod appears to be the actual pod virtual machine to the worker node virtual machine 310. Shell pod 464 may be an incomplete pod that is used as a place holder for the pod virtual machine that will be created. More particularly, the worker node virtual machine 310 interacts with shim 320_1 which manages/runs pod sandbox 460 having the shell pod 464, such that shim 320_1 is a representative of the pod. Worker node virtual machine 310 sees and/or recognizes shim 320_1, which manages/runs pod sandbox 460 having the shell pod 464, as an actual pod virtual machine because of the shell pod 464. Shell pod 464 is started just like any other pod but is paused before complete setup.

At block 508, worker node virtual machine 310 is configured to use shim 320_1 to call a (pod) virtual machine service 432 and cause virtual machine service 432 to create/ instantiate pod virtual machine 301. Shim 320_1 includes computer-executable instructions for communicating with virtual machine service 432 and requesting that pod virtual machine 301 be created on a host machine. The virtual machine service 432 is a service to the cluster and provides access to an endpoint. Shim 320_1 of worker node virtual machine 310 calls virtual machine service 432 because it needs a service endpoint, and then virtual machine service 432 selects a host machine (e.g., a computer system) according to its policy, such as, resource usage of host. For example, worker node virtual machine 310 may be hosted on computer system 251, and pod virtual machine 301 could be separately hosted on the same computer system 251 (i.e., not nested in worker node virtual machine 310) and/or hosted on a different computer system 252. Unlike state-of-the-art systems that create the pod is in the worker node virtual machine itself, in accordance with one or more embodiments of the invention, shim 320_1 has computer-executable instructions that cause virtual machine service 432 to obtain virtual resources (including CPU, memory, I/O, etc.) for creating pod virtual machine 301 outside of worker node virtual machine 310.

At block 510, worker node virtual machine 310 is configured to use shim 320_1 to perform pod virtual machine initialization, to create/call/set up an agent 420, to create/ call/set up an inner CRI 414 (e.g., inner containerd CRI) in pod virtual machine 301, and to set up a network and a tunnel between worker node virtual machine 310 and pod virtual machine 301. To set up the network, shim 320_1 is configured to communicate with and/or instruct virtual machine service 432 to cause a network handler 434 to create a logical network connection between worker node virtual machine 310 and pod virtual machine 301. This logical network connection is an overlay network that sits on top of the underlay network. Using the overlay network, worker node virtual machine 310 is configured to provide pod virtual machine 301 with an internet protocol (IP) address. The logical network connection creates a tunnel between worker node virtual machine 310 and pod virtual machine 301 for communicating as discussed herein. Worker node virtual machine 310 has a worker node identity and pod virtual machine 301 has a pod identity, both of which are utilized to create the logical network connection and stored in mapping table 650 in FIG. 6. Via the logical connection from virtual ethernet (e.g., eth0) in worker node virtual machine 310 to virtual ethernet (e.g., eth0) in pod virtual machine 301, the worker node virtual machine 310 and pod virtual machine 301 are on the same network. Network handler 434 may work in conjunction with a hypervisor to provide the logical network connection. The network handler 434 is running on the host (e.g., computer system 251) and is responsible for creating the underlay network to connect remote pod virtual machine and worker node virtual machine. When the pod virtual machine and the worker node virtual machine are running on two separate hosts, there can be two separate host operating systems and two network handlers which work together in a network.

After setting up the logical connection, shim 320_1 creates agent 420, and agent 420 in pod virtual machine 301 is configured to communicate with shim 320_1 in worker node virtual machine 310. In one or more embodiments, shim 320_1 can call agent 420 to be created in pod virtual machine 301. In one or more embodiments, shim 320_1 can create agent 420 in the sandbox 460 and forward agent 420 to pod virtual machine 301. Agent 420 includes computer-executable instructions to operate as discussed herein. After setting up the logical connection, shim 320_1 creates inner CRI 414, and inner CRI 414 is configured to create containers in pod virtual machine 301. Agent 420 is configured to help forward the requests between shim 320 and inner CRI 414. In one or more embodiments, shim 320_1 can call inner CRI 414 to be created in pod virtual machine 301 using agent 420. In one or more embodiments, shim 320_1 can create CRI 414 in the sandbox 460 and forward CRI 414 to pod virtual machine 301 via agent 420.

At block 512, shim 320_1 is configured to call/cause inner CRI 414 to create example containers 440 and 441. For example, shim 320_1 is configured to forward APIs and/or API objects for containers intended for shell pod 464 to pod virtual machine 301 via agent 420, particularly, to inner CRI 414 in order for inner CRI 414 to create containers 440 and 441. Shim 320_1 is configured to send requests to agent 420 which then redirects the requests to inner CRI 414 in pod virtual machine 301. CRI 414 is instructed to call containerd to create containers 440 and 441. The containers 440 and 441 are each open/run to start/instantiate a separate software application on pod virtual machine 301 such that the software application executes on the host machine that runs pod virtual machine 301. Instead containers 440 and 441 being formed in shell pod 464 of sandbox 460, containers 440 and 441 are formed in pod virtual machine 301. Further, a paused container 462 may be started in sandbox 460. Paused container 462 is incomplete and/or is a shell of a container.

At block 514, customized cAdvisor 410 and/or kubelet 312 (customized cAdvisor 410 may be in kubelet 312) is configured to call a resource awareness service 430 in order to report pod virtual machine 301 for resource monitoring. Reporting pod virtual machine 301 includes reporting the pod identity for pod virtual machine 301 to resource awareness service 430 and to API server 204. Resource awareness service 430 is configured to maintain resources for pod virtual machine 301.

Figure 6:
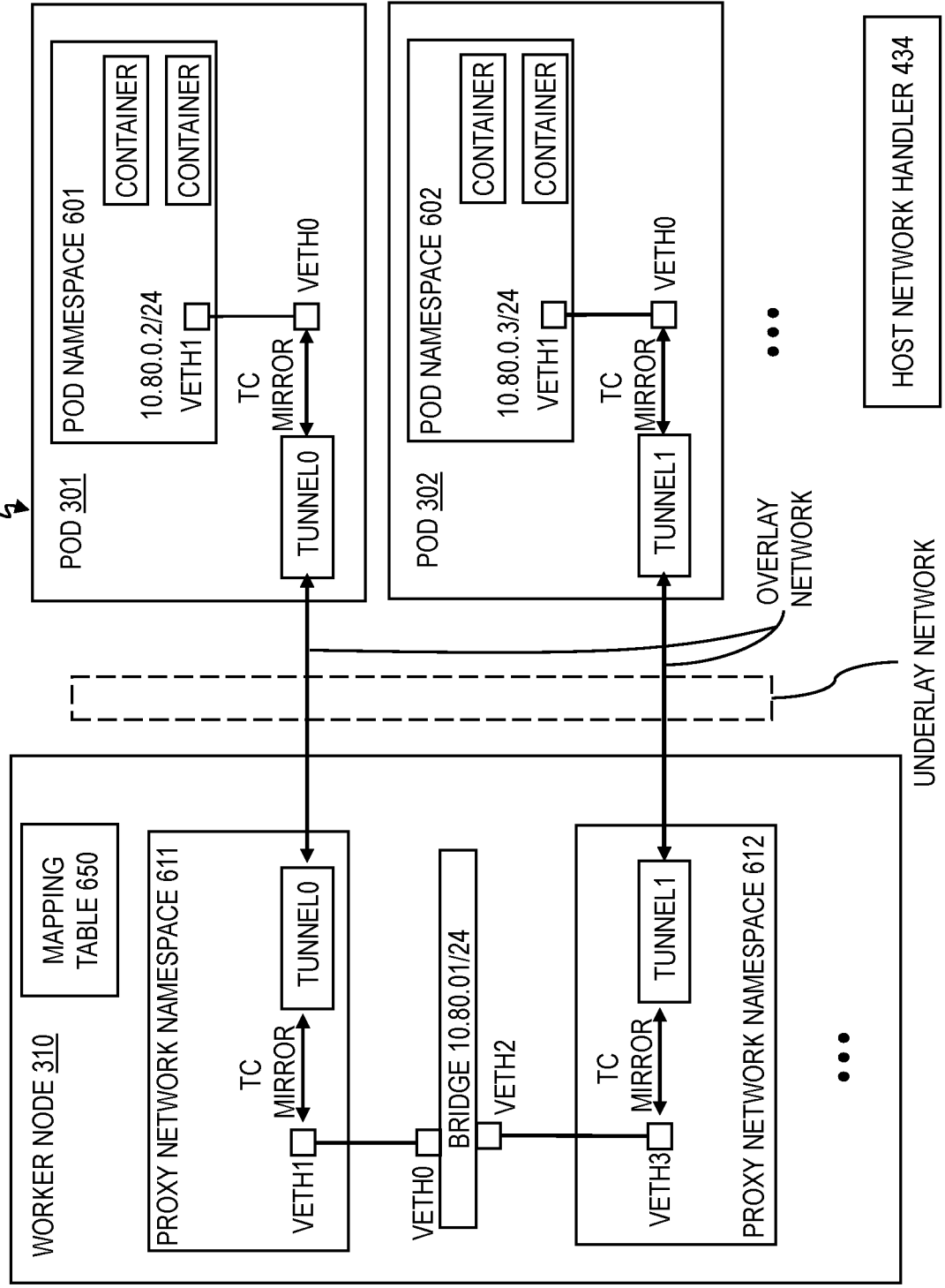
FIG. 6 depicts an example network architecture in the system for providing and using remote pods as virtual machines in Kubernetes in accordance with one or more embodiments of the present invention.

FIG. 6 is a block diagram of an example network architecture in system 200 for providing and using remote pods as virtual machines in Kubernetes in accordance with one or more embodiments of the present invention. System 200 in FIG. 6 omits some elements so as not to obscure the figure, although it should be appreciated that system 200 includes the elements and their functions as discussed herein. Pod virtual machines 301, 302 are shown for conciseness, but the description applies to pod virtual machine 303 and any additional pod virtual machines.

Host network handler 434 is responsible for providing access to the underlay network for setting up the overlay network for worker node virtual machine 310 and pod virtual machines 301, 302. The underlay network is the physical infrastructure on which the overlay network is built. The underlay network is the underlying network responsible for delivery of packets across networks. The overlay network can be a virtual local area network (VLAN) and/or any applicable network setup by CNI 316. As initialized by shim 320_1 during creation of the pod virtual machines, each of pod virtual machines 301, 302 has a unique pod namespace. For example, pod virtual machine 301 has pod namespace 601, while pod virtual machine 302 has pod namespace 602. Similarly, shim 320_1 is configured to create proxy network namespace 611 and proxy network namespace 612 in worker node virtual machine 310. Each pod namespace 601, 602 is an object in pod virtual machines 301, 302 respectively, and each proxy network namespace 611, 612 is an object in worker node virtual machine 310. Using the pod identity for pod virtual machine 301 stored in mapping table 650, shim 320_1 assigns proxy network namespace 611 to be a proxy or proxy network for pod virtual machine 301. Using the pod identity for pod virtual machine 302 stored in mapping table 650, shim 320_1 assigns proxy network namespace 612 to be a proxy or proxy network for pod virtual machine 302. This mapping is stored in mapping table 650.

Each pod virtual machine 301, 302 has a virtual ethernet connection into the pod namespace having the containers and out of the pod namespace. For example, pod virtual machine 301 has virtual ethernet connection (VETH1) in the pod namespace 601 connected to another virtual ethernet connection (VETH0) that is outside the pod namespace 601 in pod virtual machine 301, where the virtual ethernet connections (VETH1 and VETH0) are a pair. Pod virtual machine 302 has virtual ethernet connection (VETH1) in the pod namespace 602 connected to another virtual ethernet connection (VETH0) that is outside the pod namespace 602 in pod virtual machine 302, where the virtual ethernet connections (VETH1 and VETH0) are a pair on pod virtual machine 302. In worker node virtual machine 310, proxy network namespace 611 has virtual ethernet connection (VETH1) in the proxy network namespace 611 connected to another virtual ethernet connection (VETH0) that is outside the proxy network namespace 611, where the virtual ethernet connections (VETH1 and VETH0) are a pair. In worker node virtual machine 310, proxy network namespace 612 has virtual ethernet connection (VETH3) in the proxy network namespace 612 connected to another virtual ethernet connection (VETH2) that is outside the proxy network namespace 612, where the virtual ethernet connections (VETH3 and VETH2) are another pair. Proxy network namespaces 611, 612 are each connected to the bridge (having its own IP address) via their respective virtual ethernet connections.

CNI 316 and/or shim 320_1 is configured to create a tunnel (e.g., tunnel 0) such as a virtual private network between proxy network namespace 611 in worker node virtual machine 310 and pod namespace 601 in pod virtual machine 301, such that traffic (e.g., data) is mirrored/copied and communicated back and forth between worker node virtual machine 310 and pod namespace 601. Similarly, CNI 316 and/or shim 320_2 is configured to create another tunnel (e.g., tunnel 1) such as a virtual private network between proxy network namespace 612 in worker node virtual machine 310 and pod namespace 602 in pod virtual machine 301, such that traffic (e.g., data) is mirrored/copied and communicated back and forth between worker node virtual machine 310 and pod namespace 602. In other words, the tunnels and virtual ethernet connections mirror traffic back and forth. CNI 316 and/or shim 320_1 is configured to assign unique IP addresses to each of the pod namespaces 601, 602 respectively in pod virtual machines 301, 302, all of which is stored in mapping table 650.

As discussed herein, pod virtual machines 301, 302, 303 can be deployed to run on any host machines which can each be different from the host machine running worker node virtual machine 310, and/or one or more pod virtual machines 301, 302, 303 may be on the same host machine as worker node virtual machine 310 while other pod virtual machines are on different host machines. From the worker node's standpoint, it is not aware that the real container footprints are on other virtual machines different from worker node virtual machine 310. That means no CNI code is on the pod virtual machines. Further, worker node virtual machine 310 interfaces with shim 320_1, 320_2, 320_3 which has created proxy network namespaces; therefore, using proxy network namespaces, the worker node virtual machines 310 sends and receives data from pod namespaces as though pod virtual machines 301, 302, 303 are present on the same host machine.

Figure 7:
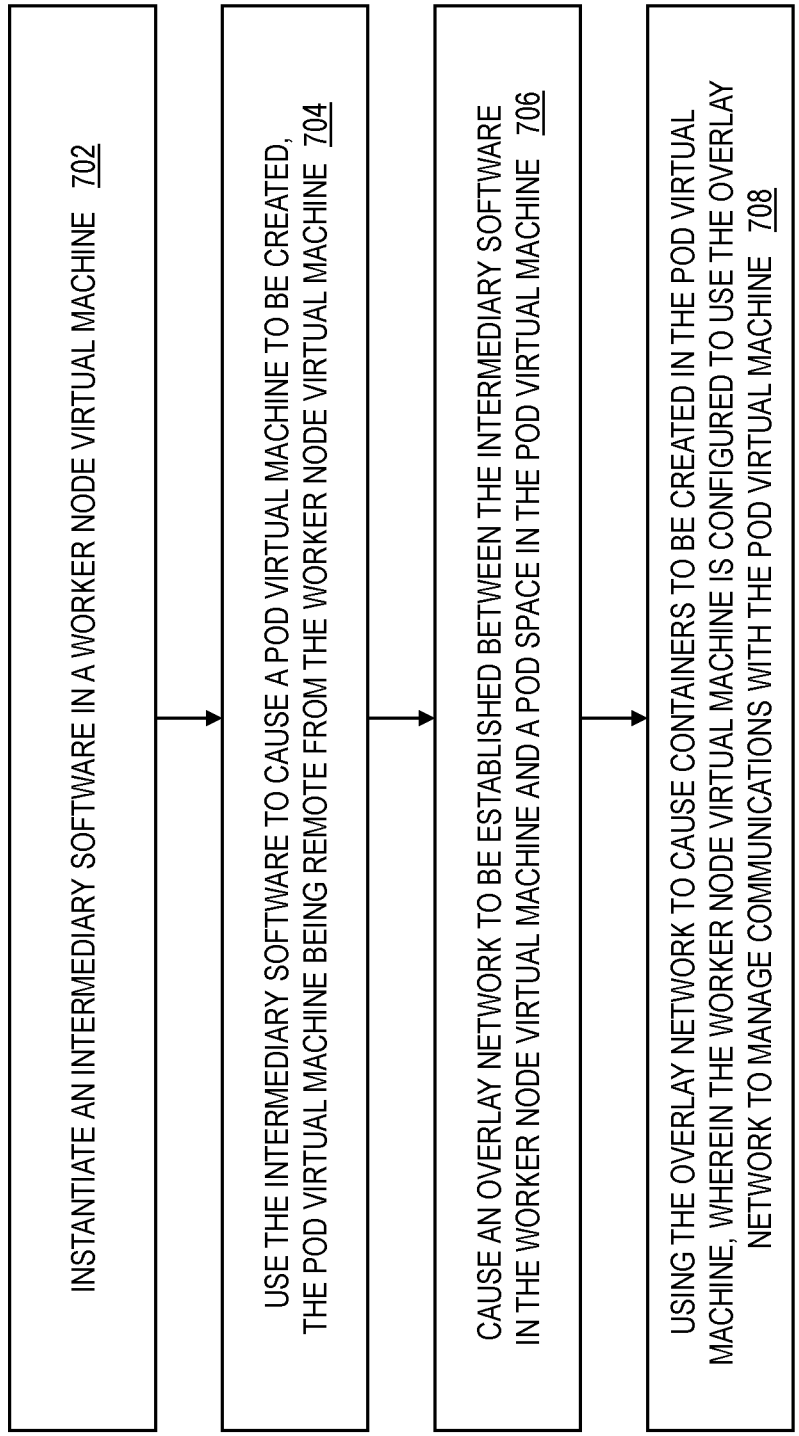
FIG. 7 depicts a flowchart of a computer-implemented process for providing and using remote pods as virtual machines in Kubernetes in accordance with one or more embodiments of the present invention.

FIG. 7 is a flowchart of a computer-implemented method 700 for instantiating/starting and using remote pod virtual machines which are remote from their worker node virtual machine in accordance with one or more embodiments of the present invention. The computer-implemented method 700 in FIG. 7 can be implemented using system 200. Reference can be made to FIGS. 1-6, where appropriate.

At block 702 of computer-implemented method 700, worker node virtual machine 310 is configured to instantiate/start/call an intermediary software (e.g., shim 320) in a worker node virtual machine 310. For example, CRI 316 (e.g., such as containerd) may instantiate/start/call shim 320 in worker node virtual machine 310.

At block 704, worker node virtual machine 310 is configured to use the intermediary software (e.g., shim 320_1) to cause a pod virtual machine (e.g., pod virtual machine 301) to be created, the pod virtual machine (e.g., pod virtual machine 301) being remote from the worker node virtual machine 310. For example, pod virtual machine 301 is not nested and/or contained within worker node virtual machine 310. Pod virtual machine 301 may be hosted on the same host machine as worker node virtual machine 310, for example, both can be hosted on computer system 251. Pod virtual machine 301 and worker node virtual machine 310 may be hosted on different host machines, for example, one can be hosted on computer system 251 and the other hosted on computer system 252.

At block 706, worker node virtual machine 310 is configured to cause an overlay network to be established between the intermediary software (e.g., shim 320_1) in the worker node virtual machine 310 and a pod space (e.g., pod namespace 601) in the pod virtual machine (e.g., pod virtual machine 301).

At block 708, worker node virtual machine 310 is configured to use the overlay network to cause containers (e.g., containers 440, 441) to be created in the pod virtual machine (e.g., pod virtual machine 301), wherein the worker node virtual machine 310 is configured to use the overlay network to manage communications with the pod virtual machine (e.g., pod virtual machine 301).

The intermediary software (e.g., shim 320_1) is configured to generate an isolated computing environment on the worker node virtual machine 310. For example, shim 320_1 is configured to start/generate sandbox 460 as an isolated computing environment on worker node virtual machine 310.

The intermediary software (e.g., shim 320_1) is configured to create a proxy network space in an isolated computing environment on the worker node virtual machine. For example, shim 320_1 is configured to start/create proxy network namespace 611 in sandbox 460 as an isolated computing environment on worker node virtual machine 310.

The intermediary software (e.g., shim 320_1) is configured to cause a logical network to be connected between a proxy network space (e.g., proxy network namespace 611) on the worker node virtual machine 310 and the pod space (e.g., pod namespace 601) on the pod virtual machine (e.g., pod virtual machine 301). The logical network (via overlay network) can be a tunnel such a virtual private network that uses a virtual local area network, virtual ethernet, etc., for communication between proxy network namespace 611 on the worker node virtual machine 310 and pod namespace 601 (having a running software application formed using container 440).

An internet protocol (IP) address is assigned to a proxy network space (e.g., proxy network namespace 611) of the worker node virtual machine 310, and the intermediary software is configured to reassign/move the IP address to the pod space (e.g., pod namespace 601). For example, shim 320_1 is configured to pull the image for the container that is intended to be created, and shim 320_1 is configured to create/start a container 462 in sandbox 460, where the container 462 is subsequently paused. Container 462 is stopped and is a shell container. Once shim 320_1 informs CNI 316 that container 462 has been created/started on worker node virtual machine 310, CNI 316 (e.g., using classless inter-domain routing (CIDR)) assigns a TCP/IP address to the paused container 462, and shim 320_1 is configured to move/assign the TCP/IP address from proxy network namespace 611 (which may be in sandbox 460) in worker node virtual machine 310 to pod virtual machine 301, thereby setting up the network. Accordingly, pod namespace 601 is assigned the TCP/IP address.

In response to receiving a container intended for an isolated computing environment on the worker node virtual machine, worker node virtual machine 310 is configured to transfer the container to the pod virtual machine to be associated with the pod space. For example, shim 320_1 is configured to transfer container 440, 441 to pod namespace 601. The intermediary software (e.g., shim 320_1) is configured to cause a software application in the container 440, 441 to be instantiated on the pod virtual machine (e.g., pod virtual machine 301). Accordingly, the software application is configured to execute on pod virtual machine 301 remote from worker node virtual machine 310.

Figure 8:
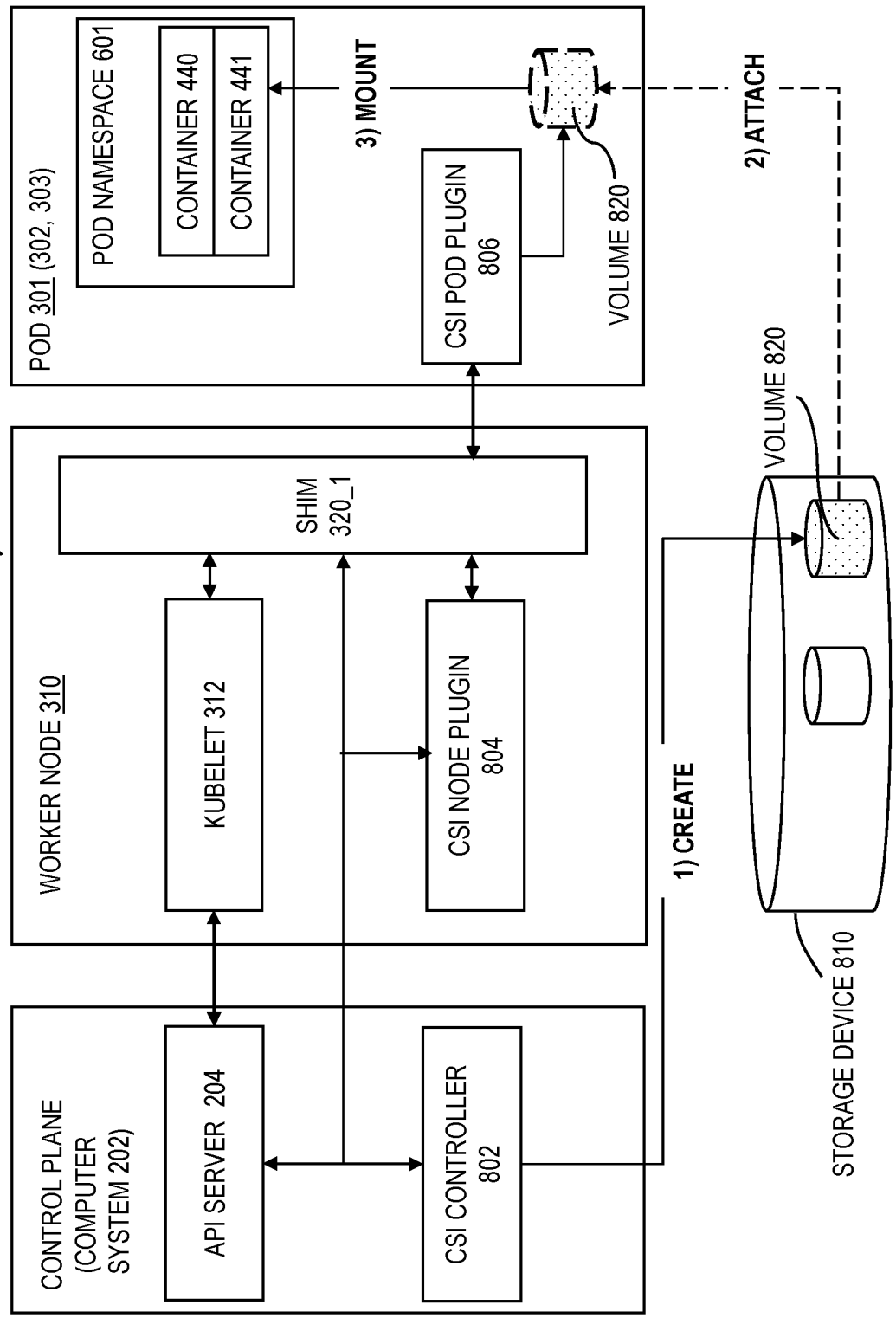
FIG. 8 depicts a block diagram of an example container storage interface architecture in the system for a new container storage system in remote pods in Kubernetes in accordance with one or more embodiments of the present invention.

FIG. 8 is a block diagram of an example container storage interface architecture in system 200 for a new container storage system in remote pods in Kubernetes in accordance with one or more embodiments of the present invention. System 200 in FIG. 8 omits some elements so as not to obscure the figure, although it should be appreciated that system 200 includes the elements and their functions as discussed herein. Pod virtual machine 301 is shown for conciseness, but the description applies to pod virtual machines 302, 303 and any additional pod virtual machines.

FIG. 8 illustrates an example of how to attach and mount a persistent volume 820 in storage device 810 to a remote pod, such as, for example, remote pod virtual machine 301, while remote pod virtual machine 301 is running in a separate virtual machine from worker node virtual machine 310. Unlike ephemeral storage and cloud object storage, persistent volume 820 can be file storage, block storage, etc., in accordance with one or more embodiments. On-disk files in a container are ephemeral, which presents some problems for applications when running in containers. One problem is the loss of files when a container crashes; the kubelet restarts the container but with a clean state. Typically, it is noted that any volume attached to a worker node virtual machine cannot be mounted to remote pod virtual machines because they are running in separate virtual machines. However, one or more embodiments are configured to use a container storage interface (CSI) controller plugin 802, a CSI node plugin 804, shim 320, and a CSI pod plugin 806 to attach and mount persistent volume 820 to pod virtual machine 301.

Container storage interface (CSI) is a specification to establish an industry standard interface that Container Orchestration Systems (COs) can use to expose arbitrary storage systems to their containerized workloads. In-tree refers to code that exists in the core Kubernetes repository. Out-of-tree refers to code that exists somewhere outside the core Kubernetes repository. CSI volume plugin refers to code that exists somewhere outside the core Kubernetes repository. CSI volume driver is an out-of-tree CSI compatible implementation of a volume plugin that can be used in Kubernetes through the Kubernetes CSI Volume Plugin.

A persistent volume or PersistentVolume (PV) is a piece of storage in the cluster that has been provisioned by an administrator or dynamically provisioned using Storage Classes. The persistent volume is a resource in the cluster just like a node is a cluster resource. Persistent volumes are volume plugins but have a lifecycle independent of any individual pod that uses the persistent volume. This API object captures the details of the implementation of the storage, be that NFS, ISCSI, or a cloud-provider-specific storage system. File storage, block storage, and object storage are storage formats that hold, organize, and present data in different ways, each with their own capabilities and limitations. File storage organizes and represents data as a hierarchy of files in folders; block storage chunks data into arbitrarily organized, evenly sized volumes; and object storage manages data and links it to associated metadata.

CSI controller plugin 802 in the control plane of, for example, computer system 202 is configured to create persistent volume 820 in (hardware) storage device 810 and prepare for attaching persistent volume 820 to worker node virtual machine 310. CSI controller plugin 802 is configured to call CSI node plugin 804 in worker node virtual machine 310, and instead of attaching persistent volume 820 to worker node virtual machine 310, CSI node plugin 804 is configured to call shim 320_1 such that shim 320_1 causes and/or instructs CSI pod plugin 806 to attach persistent volume 820 to pod virtual machine 301. In one or more embodiments, CSI controller plugin 802 and/or CSI node plugin 804 may attempt/request to attach persistent volume 820 to pod shell 464 in pod sandbox 460 of worker node virtual machine 310, which triggers shim 320_1 to call CSI pod plugin 806. Accordingly, shim 320_1 causes and/or instructs CSI pod plugin 806 to attach persistent volume 820 to pod virtual machine 301. After attaching persistent volume to pod virtual machine 301, shim 320_1 is configured to cause and/or instruct CSI pod plugin 806 to mount persistent volume 820 to the pod virtual machine 301, particularly to containers 440, 441 for use as persistent storage.

VolumeAttachment captures the intent to attach and/or detach the specified volume to/from the specified node. VolumeAttachment objects are non-namespaced. The in-tree CSI volume plugin will implement the following internal Kubernetes volume interfaces: 1) mounting/unmounting of a volume to a specific path; and attaching/detaching of a volume to a given node. For mounting and unmounting, the in-tree volume plugin's SetUp and TearDown methods will trigger the NodePublish Volume and NodeUnpublish Volume CSI calls via Unix Domain Socket (UDS). Accordingly, Kubernetes will generate a unique target_path (unique per pod per volume) to pass via NodePublish Volume for the CSI plugin to mount the volume. Later, upon successful completion of the NodeUnpublish Volume call (once volume unmount has been verified), Kubernetes will delete the directory.

Figure 9:
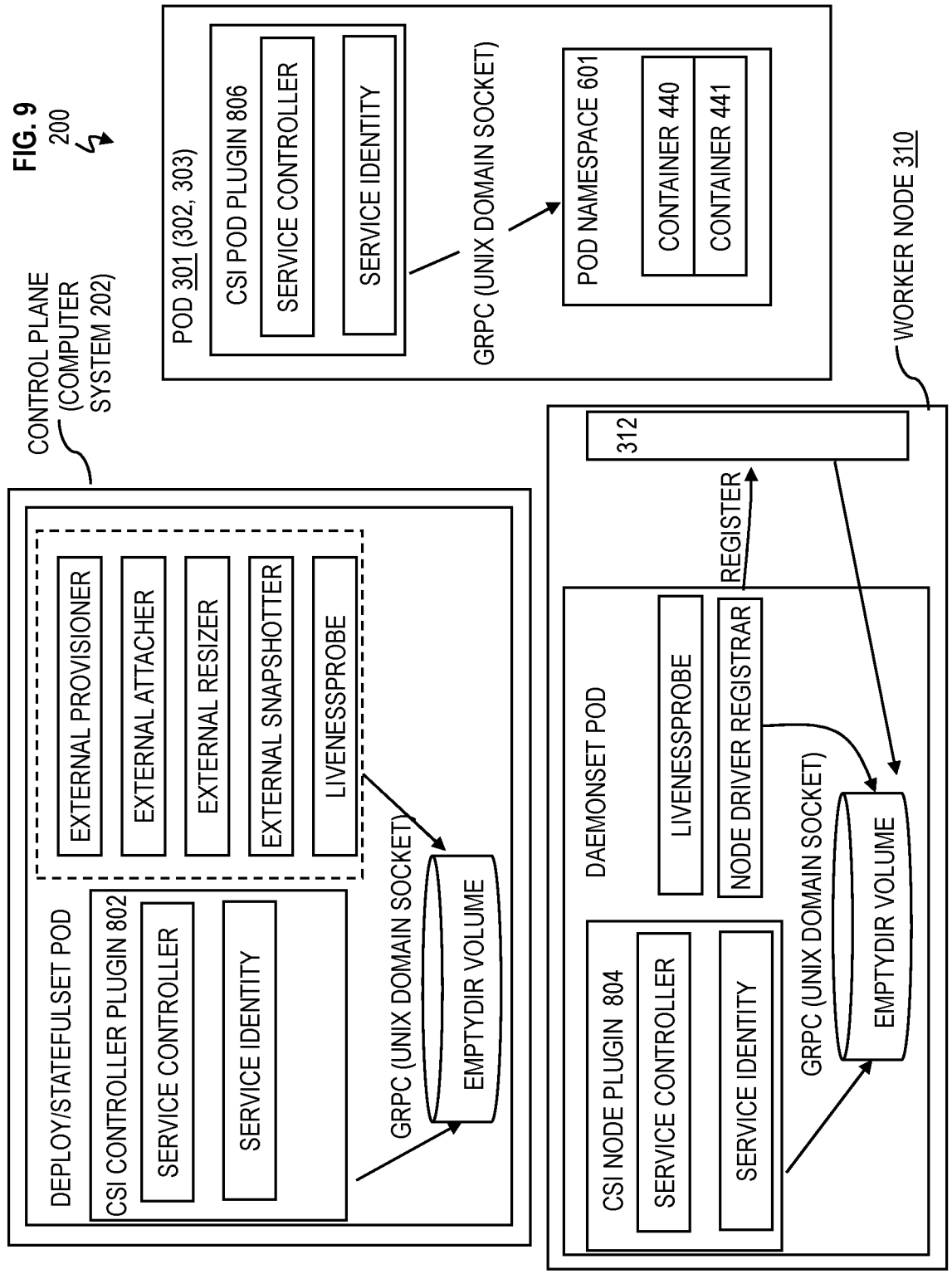
FIG. 9 depicts a block diagram illustrating further details of an architecture in the system for installing a new container storage system in remote pods in Kubernetes using one or more new components in a container storage interface driver in accordance with one or more embodiments of the present invention.
Figure 10:
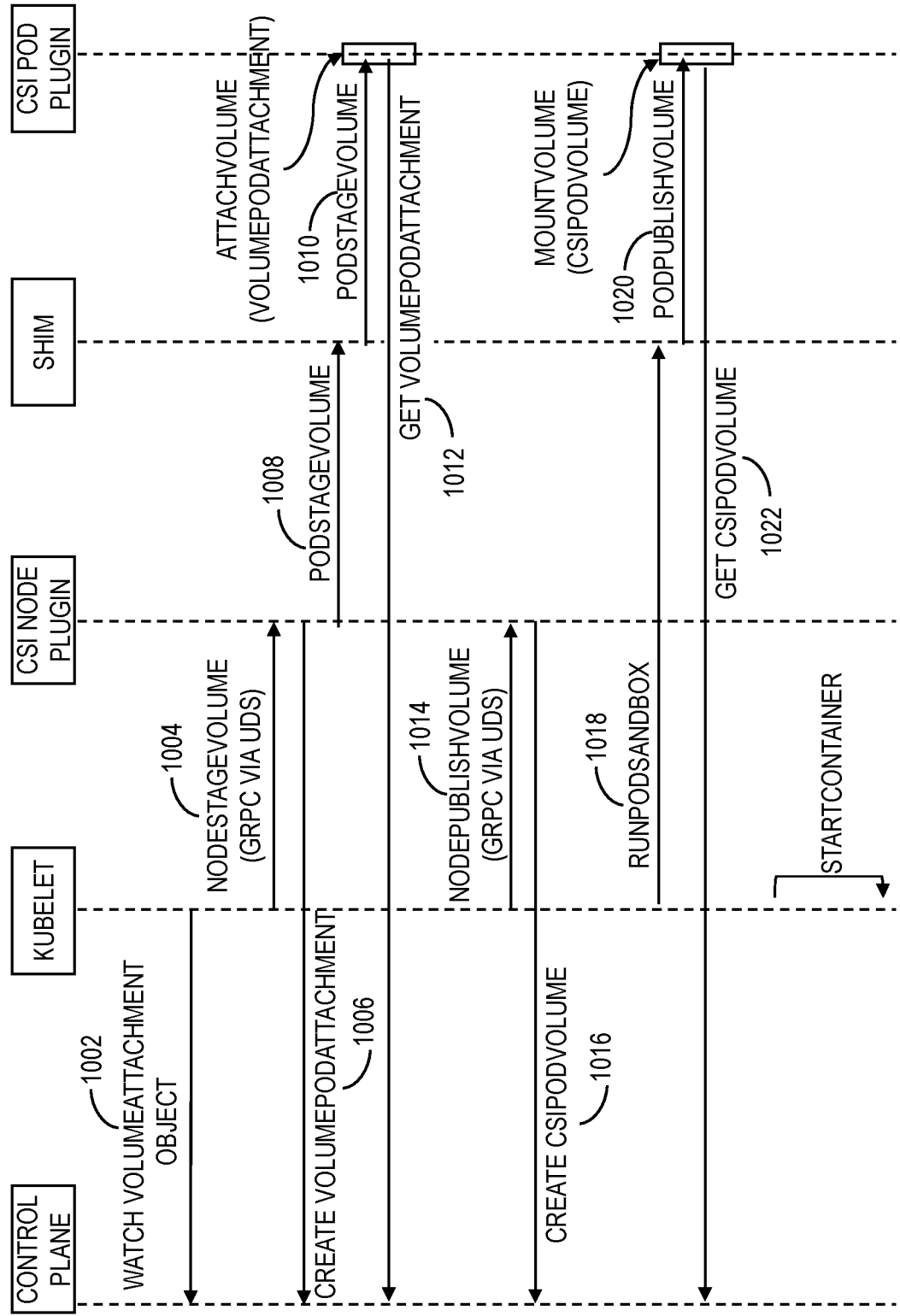
FIG. 10 is a block diagram of a process for installing the new container storage system in remote pods in Kubernetes using the new container storage interface in the system in accordance with one or more embodiments of the present invention.

FIG. 9 is a block diagram illustrating further details of an architecture in system 200 for installing a new container storage system in remote pods in Kubernetes using one or more new components in a container storage interface driver in accordance with one or more embodiments of the present invention. FIG. 10 is a block diagram of a process for installing the new container storage system in remote pods in Kubernetes using the new container storage interface in system 200 in accordance with one or more embodiments of the present invention. Although not shown in FIG. 10 for conciseness, there are various functions performed by the control plane in computer system 202 in order to attach and mount a volume to a container as understood by one skilled in the art. One or more embodiments further provide a process to attach the persistent volume 820, for example, file storage and/or block storage, to remote pod virtual machine 301 and mount the persistent volume 820 to one or more containers 440, 441.

In FIG. 9, to deploy a containerized (third-party) CSI volume driver, FIG. 9 can be utilized to create a CSI volume driver container that implements the volume plugin behavior and exposes a gRPC interface via a Unix domain socket including Controller, Node, and Identity services. FIG. 9 can be utilized to bundle the CSI volume driver container with optional helper containers (such as, e.g., external attacher, external provisioner, node-driver-registrar, cluster-driver-registrar, external resizer, external snapshotter, livenessprobe, etc.) that will assist CSI volume driver container in interacting with the Kubernetes system. More specifically, FIG. 9 can create the following Kubernetes objects to facilitate communication with the Kubernetes controllers, a StatefulSet or a Deployment that has the CSI volume driver container: containers provided by the Kubernetes; cluster-driver-registrar; external provisioner (required for provision/delete operations); external attacher (required for attach/detach operations); external resizer (required for resize operations); external snapshotter (required for volume-level snapshot operations), and livenessprobe. FIG. 9 includes emptyDir volume which is mounted by all containers, including the CSI volume driver. The CSI volume driver container create its Unix Domain Socket in this directory to enable communication with the Kubernetes helper container (s). FIG. 9 may include a DaemonSet to facilitate communication with every instance of kubelet that has the CSI volume driver container, the node-driver-registrar which is responsible for registering the Unix domain socket with kubelet, and the livenessprobe.

With reference to FIG. 9, using the control plane in computer system 202, a user which can be an instance (such as an application) and/or an object is configured to create a persistent volume claim (PVC) object on API server 204 and/or request that API server 204 creates the persistent volume claim. A Persistent Volume Claim (PVC) is a request for storage by a user. The persistent volume claim is similar to a pod. Pods consume node resources and persistent volume claims consume persistent volumes resources. Just as pods can request specific levels of resources (e.g., CPU and memory), persistent volume claims can request specific size and access modes (e.g., access mode can be mounted ReadWriteOnce, ReadOnlyMany, ReadWriteMany, etc.)

While API server 204 is creating the PVC object, an external provisioner is configured to watch/monitor for the PVC object. Watch is to monitor for changes to the described resources and return them as a stream of add, update, and remove notifications. Once the external provisioner finds the PVC object on API server 204, the external provisioner is configured to transmit a create volume request, for example, using Google® remote procedure calls (gRPC) via Unix domain socket (UDS), to CSI controller plugin 802. CSI controller plugin 802 is configured to create the volume and inform the external provisioner that the volume is created. The external provisioner is configured to instruct API server 204 to create a persistent volume (PV) object. Controller manager (e.g., CSI controller plugin 802) is configured to create volume attachment object and send the created volume attachment object to API server 204; external provisioner is configured to update the PVC object and bind the PVC object to the volume attachment object such that the PVC object is available for use. The external attacher is configured to watch/monitor for the volume attachment object, and once found, the external attacher is configured to send out controller publish volume (e.g., using gRPC via UDS) to CSI controller plugin 802. Accordingly, CSI controller plugin 802 is configured to attach the volume and then inform external attacher that the volume is attached to worker node virtual machine 310. External attacher is configured to instruct API server 204 to update the volume attachment object. Attach/detach operations are also be handled by an external component (an "attacher"). The attacher watches the Kubernetes API on behalf of the external CSI volume driver for new VolumeAttachment objects and triggers the appropriate calls against the CSI volume driver to attach the volume. The attacher is to watch for VolumeAttachment object and mark it as attached even if the underlying CSI driver does not support ControllerPublish Volume call, because Kubernetes has no knowledge about it. Although an example illustration of has been discussed for actions taken at the control plane of computer system 202, it should be appreciated that more actions, fewer actions, and in some cases different actions may occur, as known by one of ordinary skill in the art.

Referring to FIG. 10 which will illustrate further details regarding worker node virtual machine 310 and remote pod virtual machine 301, kubelet 312 in worker node virtual machine 310 is triggered by the attached volume performed by CSI controller plugin 802, and kubelet 312 is configured to watch/monitor the volume attachment object in API server 204 of the control plane, at action 1002. At action 1004, kubelet 312 is configured to inform CSI node plugin 804 to perform node stage volume (e.g., using gRPC via UDS), and CSI node plugin 804 is configured to send create volume pod attachment to the control plane at action 1006. Instead of CSI node plugin 804 mounting the volume to worker node virtual machine 310, CSI node plugin 804 is configured to transmit pod stage volume to shim 320_1 at action 1008, which then passes the request for pod stage volume to CSI pod plugin 806 in remote pod virtual machine 301 at action 1010. Accordingly, CSI pod plugin 806 is configured to attach the persistent volume 820 to pod virtual machine 301 upon receiving the pod stage volume request, and this is the volume pod attachment. At action 1012, CSI pod plugin 806 is configured to send get volume pod attachment to API server 204 of the control plane via shim 320_1 of worker node virtual machine 310. As such, at action 1012, CSI pod plugin 806 will retrieve the VolumePodAttachment object from the control plane, which was created at action 1006. "Get" is the method to read the status of the specified VolumeAttachment.

At action 1014 in FIG. 10, kubelet 312 is configured to inform CSI node plugin 804 to perform node publish volume (e.g., using gRPC via UDS), and instead of CSI node plugin 804 mounting the volume to worker node virtual machine 310, CSI node plugin 804 is configured to transmit create CSI pod volume to API server 204 in the control plane on computer system 202 at action 1016. Particularly, at action 1016, a CSIPodVolume object is created in the control plane, which describes the volume information and will be used at action 1022. At action 1018, kubelet 312 on worker node virtual machine 310 is configured to instruct shim 320_1 to run pod sandbox (e.g., sandbox 460), and shim 320_1 can use the pod sandbox (e.g., sandbox 460) as a template and/or computer environment which may appear to be the proxy and/or (temporary) location (e.g., the file path) for mounting the volume on worker node virtual machine 310; instead of mounting to pod sandbox 460, pod shell 464, and/or paused container 462, shim 320_1 on worker node virtual machine 310 is configured to issue pod publish volume to CSI pod plugin 806 on pod virtual machine 301 at action 1018, which causes CSI pod plugin 806 to mount the persistent volume 820 to containers 440, 441 at action 1020. CSI pod plugin 806 can mount the persistent volume 820 as CSI pod volume. CSI pod plugin sends get CSI pod volume to kubelet 312 via shim 320_1 at action 1022. At action 1022, the CSI pod plugin 806 retrieves the CSIPodVolume object which was created at action 1016.

Figure 11:
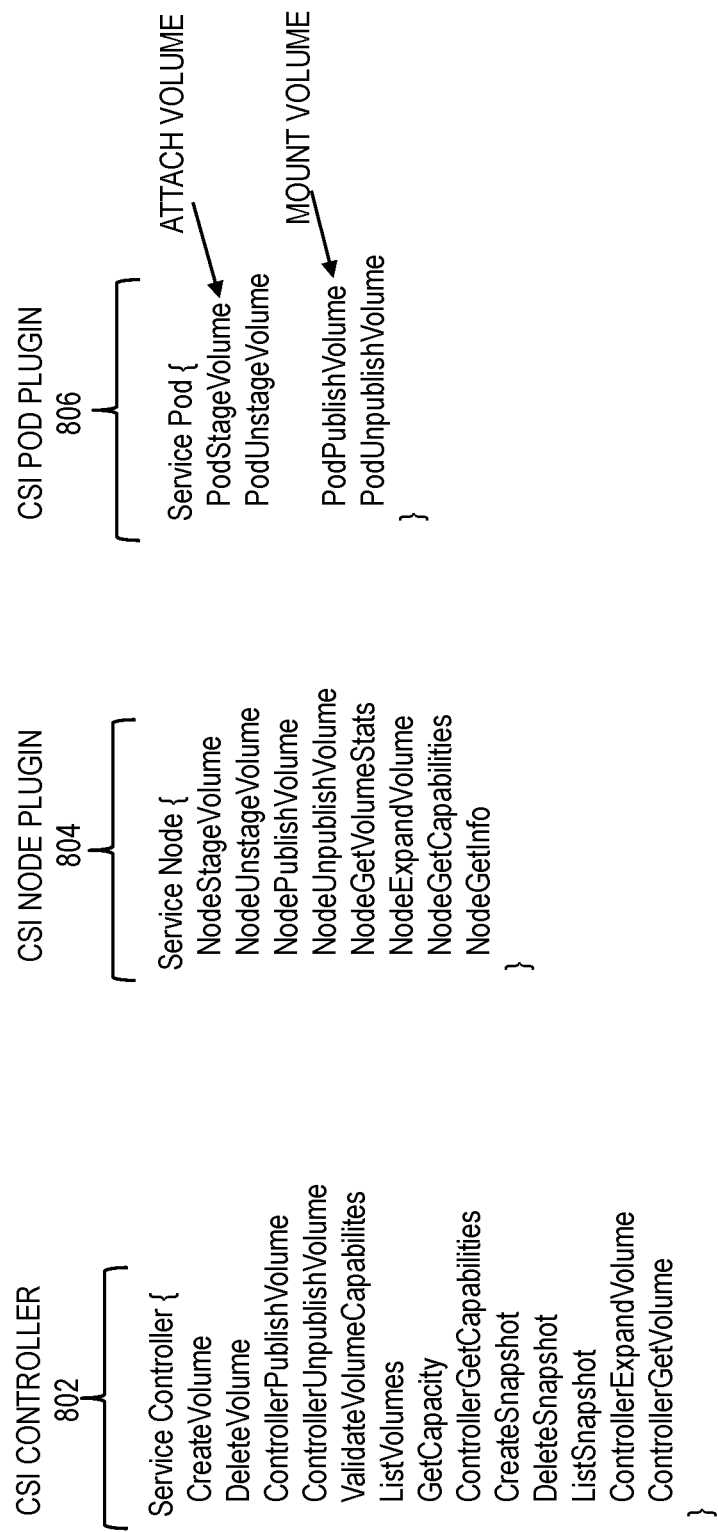
FIG. 11 depicts a block diagram of various functions that can be called and/or utilized to install a new container storage system in remote pods in Kubernetes using one or more new components in a container storage interface driver in accordance with one or more embodiments of the present invention.

FIG. 11 depicts a block diagram of various functions that can be called and/or utilized to install a new container storage system in remote pods in Kubernetes using one or more new components in a container storage interface driver in accordance with one or more embodiments of the present invention. CSI controller plugin 802, CSI node plugin 804, and CSI pod plugin 806 can execute and/or call functions to attach and mount the persistent volume 820 to containers 440, 441 in pod virtual machine 301, 302, 303 instead of to worker node virtual machine 310. CSI controller plugin 802, CSI node plugin 804, and CSI pod plugin 806 may be considered CSI drivers.

Figure 12:
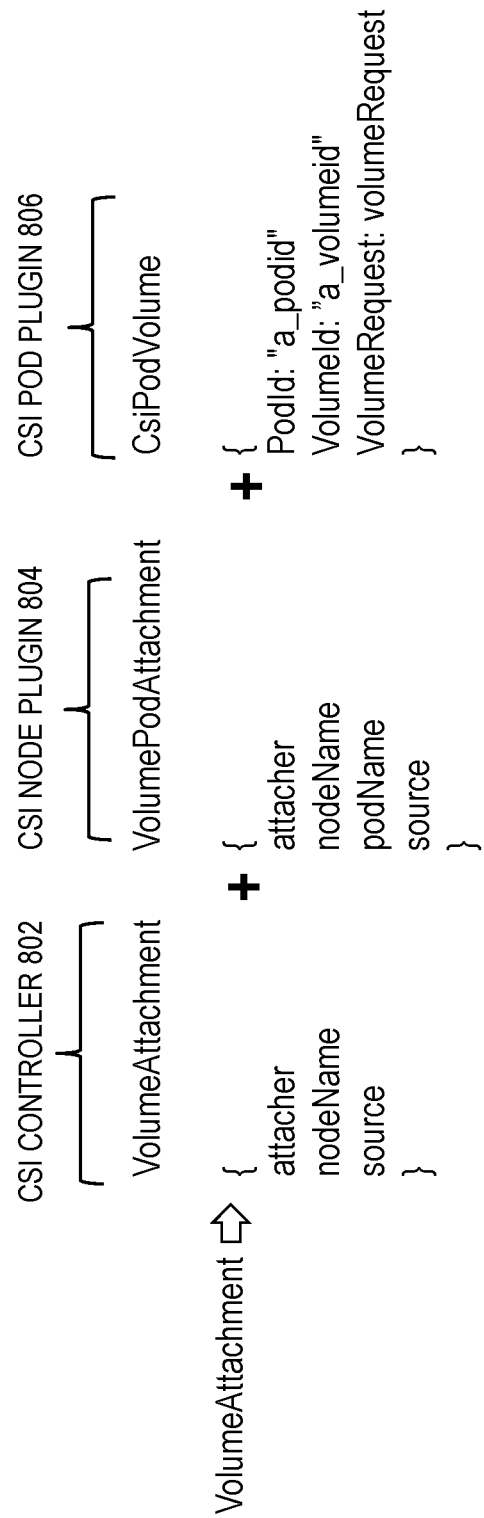
FIG. 12 depicts a block diagram of extended container storage interface objects to install a new container storage system in remote pods in Kubernetes in accordance with one or more embodiments of the present invention.

FIG. 12 depicts a block diagram of extended container storage interface objects to install a new container storage system in remote pods in Kubernetes in accordance with one or more embodiments of the present invention. Attacher indicates the name of the volume driver that is to handle this request. This is the name returned by GetPluginName ( ). NodeName is the node that the volume should be attached to. Source is the VolumeAttachmentSource which represents a volume that should be attached; PersistentVolumes can be attached via external attacher. The extended container storage interface objects can be used and/or implemented by CSI controller plugin 802, CSI node plugin 804, and CSI pod plugin 806 in accordance with one or more embodiments.

Figure 13:
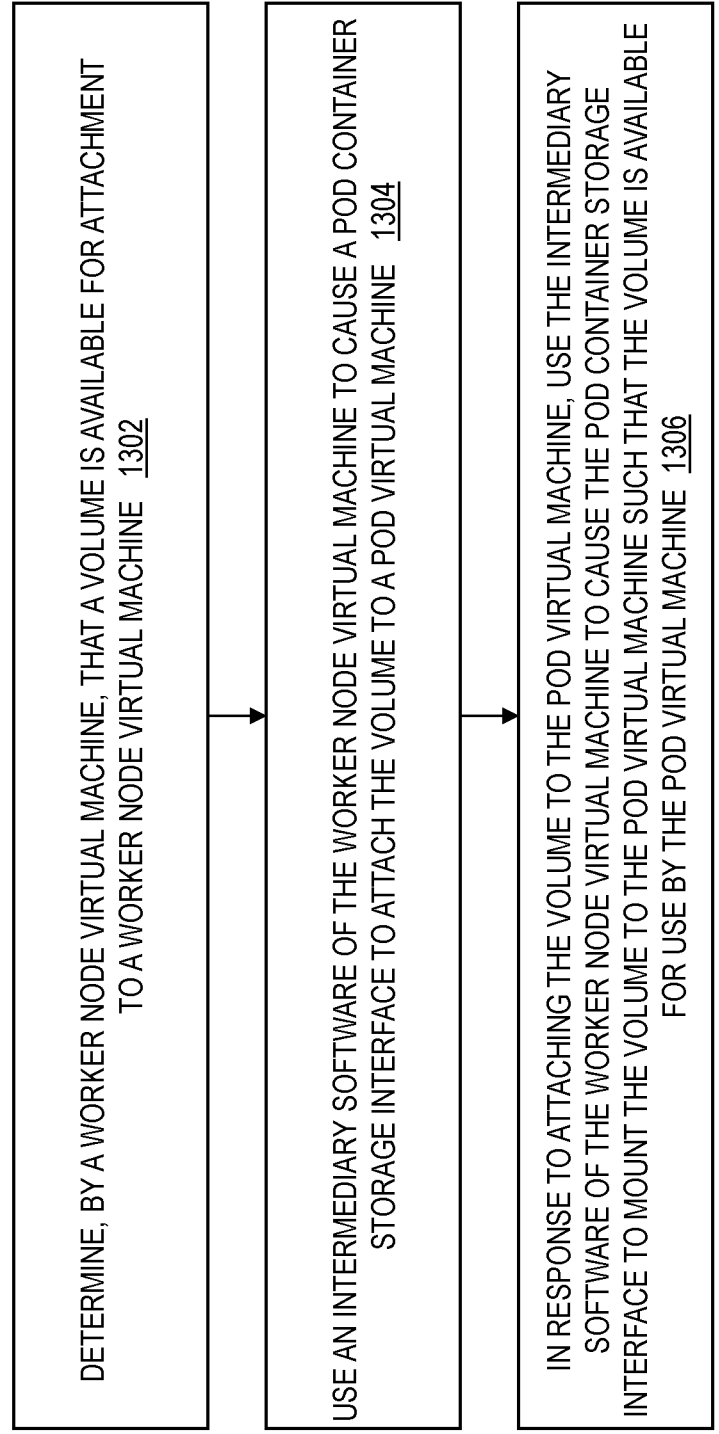
FIG. 13 is a flowchart of a computer-implemented method for attaching and mounting the persistent volume to remote pod virtual machines instead of their worker node virtual machine in accordance with one or more embodiments of the present invention.

FIG. 13 is a flowchart of a computer-implemented method 1300 for attaching and mounting the persistent volume 820 to a remote pod virtual machine instead of its worker node virtual machine in accordance with one or more embodiments of the present invention. The computer-implemented method 1300 in FIG. 13 can be implemented using system 200.

At block 1302, worker node virtual machine 310 is configured to determine that a volume (e.g., persistent volume 820) is available for attachment to a worker node virtual machine 310. For example, kubelet 312 of worker node virtual machine 310 is configured to watch/monitor for and find the volume attachment object (e.g., action 1002 in FIG. 10), which acts as a request to attach persistent volume 820 to worker node virtual machine 310.

At block 1304, worker node virtual machine 310 is configured to use an intermediary software (e.g., shim 320) of the worker node virtual machine 310 to cause a pod container storage interface (e.g., CSI pod plugin 806) to attach the volume to a pod virtual machine 301. For example, shim 320 of worker node virtual machine 310 is configured to send a request to attach the volume, for example, such as a request for pod stage volume (e.g., action 1010), to CSI pod plugin 806 which causes CSI pod plugin 806 to attach persistent volume 820 to pod virtual machine 301.

At block 1306, worker node virtual machine 310 is configured to, in response to attaching the volume to the pod virtual machine 301, use the intermediary software (e.g., shim 320) of the worker node virtual machine to cause the pod container storage interface (e.g., CSI pod plugin 806) to mount the volume (e.g., persistent volume 820) to the pod virtual machine 301 such that the volume is available for use by the pod virtual machine 301. For instance, shim 320 is configured to request/instruct, for example, using pod publish volume (e.g., action 1020), CSI pod plugin 806 to mount persistent volume 820 to pod virtual machine 301. Further, CSI pod plugin 806 can mount persistent volume 820 to containers 440, 441. Shim 320 can send the request/instructions to mount persistent volume 820, after using pod sandbox 460 as a proxy for a request to mount from kubelet 312.

The volume is a persistent volume 820. The persistent volume 820 comprises file storage. The persistent volume 820 comprises block storage. The worker node virtual machine 310 is configured to receive and/or generate a request to mount the volume (e.g., at action 1004), and instead of attaching the volume to the worker node virtual machine 310, the request triggers the intermediary software (e.g., shim 320) to cause the volume to be attached to the pod virtual machine 301 (e.g., actions 1008, 1010).

According to one or more embodiments, the worker node virtual machine 310 is configured to receive and/or generate a request to mount the volume (e.g., at action 1014), and instead of mounting the volume to the worker node virtual machine 310, the request triggers the intermediary software (e.g., shim 320) to cause the volume to be mounted to the pod virtual machine 301 (e.g., actions 1018, 1020). The intermediary software (e.g., shim 320) is configured to use an isolated computing environment (e.g., pod sandbox 460) on the worker node virtual machine 310 as a proxy for mounting the volume on the pod virtual machine 301.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
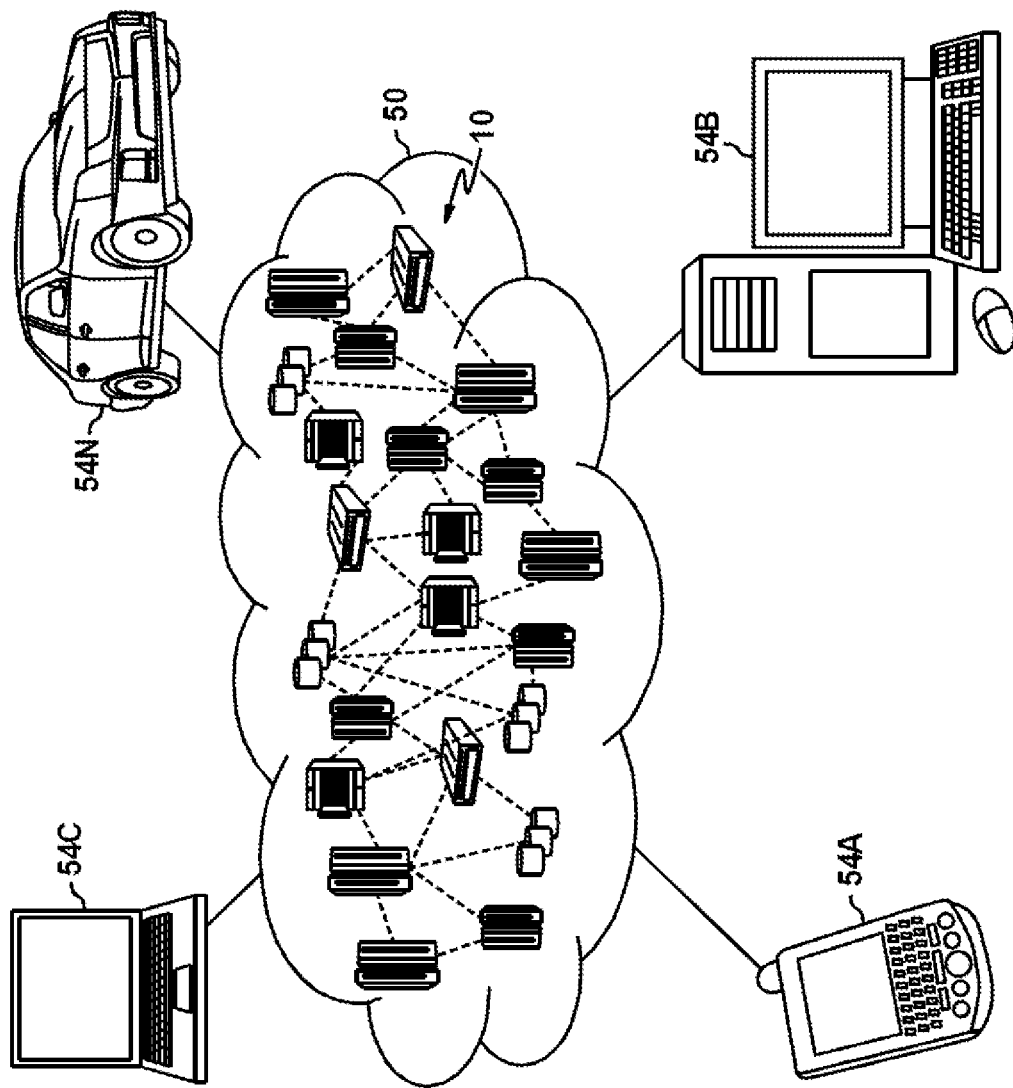
FIG. 14 depicts a cloud computing environment according to one or more embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
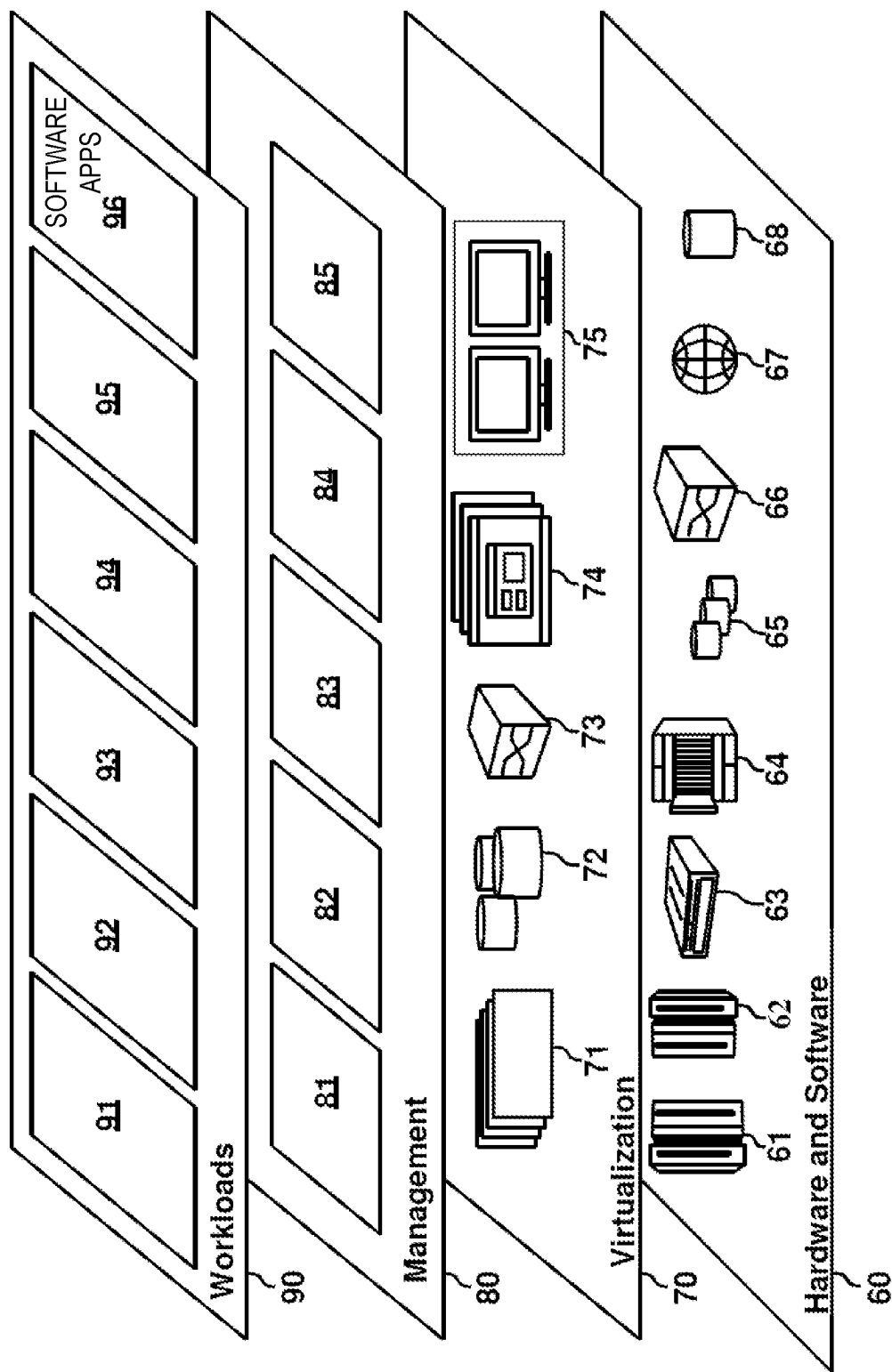
FIG. 15 depicts abstraction model layers according to one or more embodiments of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications in worker node virtual machine 310, software applications in pod virtual machines 301, 302, 303, etc.) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a worker node virtual machine, that a volume is available for attachment to the worker node virtual machine;
   using an intermediary software of the worker node virtual machine to cause a pod container storage interface to attach the volume to a pod virtual machine; and
   in response to attaching the volume to the pod virtual machine, using the intermediary software of the worker node virtual machine to cause the pod container storage interface to mount the volume to the pod virtual machine such that the volume is available for use by the pod virtual machine, wherein the intermediary software is configured to:
   pull an image for a container to be created in an isolated computing environment on the worker node virtual machine;
   create the container in the isolated computing environment using the image;
   pause the container in the isolated computing environment; and
   in response to pulling the image for the paused container, use the isolated computing environment on the worker node virtual machine as a proxy for mounting the volume to the pod virtual machine based on an address, to the paused container within the isolated computing environment, being reassigned to the pod virtual machine.

2. The computer-implemented method of claim 1, wherein the volume is a persistent volume.

3. The computer-implemented method of claim 1, wherein the volume comprises file storage.

4. The computer-implemented method of claim 1, wherein the volume comprises block storage.

5. The computer-implemented method of claim 1, wherein:
   the worker node virtual machine is configured to receive a request to attach the volume; and
   instead of attaching the volume to the worker node virtual machine, the request triggers the intermediary software to cause the volume to be attached to the pod virtual machine.

6. The computer-implemented method of claim 1, wherein:
   the worker node virtual machine is configured to receive a request to mount the volume; and
   instead of mounting the volume to the worker node virtual machine, the request triggers the intermediary software to cause the volume to be mounted to the pod virtual machine.

7. The computer-implemented method of claim 1, wherein the worker node virtual machine is running in a separate virtual machine from the pod virtual machine.

8. The computer-implemented method of claim 1, wherein the isolated environment is a sandbox.

9. A system comprising:
   a memory having computer readable instructions; and
   one or more processors for executing the computer readable instructions, the computer readable instructions controlling the one or more processors to perform operations comprising:
   determining, by a worker node virtual machine, that a volume is available for attachment to the worker node virtual machine;
   using an intermediary software of the worker node virtual machine to cause a pod container storage interface to attach the volume to a pod virtual machine; and
   in response to attaching the volume to the pod virtual machine, using the intermediary software of the worker node virtual machine to cause the pod container storage interface to mount the volume to the pod virtual machine such that the volume is available for use by the pod virtual machine, wherein the intermediary software is configured to:

pull an image for a container to be created in an isolated computing environment on the worker node virtual machine;

create the container in the isolated computing environment using the image;

pause the container in the isolated computing environment; and in response to pulling the image for the paused container, use the isolated computing environment on the worker node virtual machine as a proxy for mounting the volume to the pod virtual machine based on an address, to the paused container within the isolated computing environment, being reassigned to the pod virtual machine.

10. The system of claim 9, wherein the volume is a persistent volume.

11. The system of claim 9, wherein the volume comprises file storage.

12. The system of claim 9, wherein the volume comprises block storage.

13. The system of claim 9, wherein:

the worker node virtual machine is configured to receive a request to attach the volume; and instead of attaching the volume to the worker node virtual machine, the request triggers the intermediary software to cause the volume to be attached to the pod virtual machine.

14. The system of claim 9, wherein:

the worker node virtual machine is configured to receive a request to mount the volume; and instead of mounting the volume to the worker node virtual machine, the request triggers the intermediary software to cause the volume to be mounted to the pod virtual machine.

15. A computer program product comprising a computer readable storage medium having program instructions embodied therewith, the program instructions executable by one or more processors to cause the one or more processors to perform operations comprising:

determining, by a worker node virtual machine, that a volume is available for attachment to the worker node virtual machine;

using an intermediary software of the worker node virtual machine to cause a pod container storage interface to attach the volume to a pod virtual machine; and in response to attaching the volume to the pod virtual machine, using the intermediary software of the worker node virtual machine to cause the pod container storage interface to mount the volume to the pod virtual machine such that the volume is available for use by the pod virtual machine, wherein the intermediary software is configured to:

pull an image for a container to be created in an isolated computing environment on the worker node virtual machine;

create the container in the isolated computing environment using the image;

pause the container in the isolated computing environment; and in response to pulling the image for the paused container, use the isolated computing environment on the worker node virtual machine as a proxy for mounting the volume to the pod virtual machine based on an address, to the paused container within the isolated computing environment, being reassigned to the pod virtual machine.

16. The computer program product of claim 15, wherein the volume is a persistent volume.

17. The computer program product of claim 15, wherein the volume comprises file storage.

18. The computer program product of claim 15, wherein the volume comprises block storage.

19. The computer program product of claim 15, wherein:

the worker node virtual machine is configured to receive a request to attach the volume; and instead of attaching the volume to the worker node virtual machine, the request triggers the intermediary software to cause the volume to be attached to the pod virtual machine.

20. The computer program product of claim 15, wherein:

the worker node virtual machine is configured to receive a request to mount the volume; and instead of mounting the volume to the worker node virtual machine, the request triggers the intermediary software to cause the volume to be mounted to the pod virtual machine.

* * * * *